United States Patent
Wang et al.

(10) Patent No.: US 12,464,482 B2
(45) Date of Patent: Nov. 4, 2025

(54) SIDELINK TIMING ADVANCE FOR A REPEATER

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 17/742,109

(22) Filed: May 11, 2022

(65) Prior Publication Data
US 2023/0370989 A1    Nov. 16, 2023

(51) Int. Cl.
*H04W 56/00*    (2009.01)
*H04B 7/155*    (2006.01)

(52) U.S. Cl.
CPC ........ *H04W 56/0045* (2013.01); *H04B 7/155* (2013.01); *H04B 7/15528* (2013.01)

(58) Field of Classification Search
CPC ............................ H04B 7/155; H04B 7/15528; H04W 56/0045
See application file for complete search history.

(56) References Cited

U.S. PATENT DOCUMENTS

| | | | | |
|---|---|---|---|---|
| 8,744,340 B2* | 6/2014 | Palanki | ............... | H04W 56/001 455/7 |
| 10,869,288 B2* | 12/2020 | Yang | ................ | H04W 56/0045 |
| 2015/0181366 A1* | 6/2015 | Chae | .................. | H04W 56/001 370/336 |
| 2015/0264588 A1* | 9/2015 | Li | ....................... | H04W 56/002 370/350 |
| 2017/0078998 A1* | 3/2017 | Li | .......................... | H04W 56/00 |
| 2019/0281582 A1* | 9/2019 | Chen | ..................... | H04W 4/80 |
| 2020/0053682 A1* | 2/2020 | Abedini | ............ | H04W 56/0025 |
| 2020/0280941 A1* | 9/2020 | Chae | ..................... | H04W 48/20 |
| 2020/0396734 A1* | 12/2020 | Li | ...................... | H04W 56/0005 |
| 2021/0250884 A1* | 8/2021 | Iyer | ..................... | H04W 56/0045 |
| 2021/0352607 A1* | 11/2021 | Miao | ................ | H04W 56/0045 |
| 2021/0377993 A1* | 12/2021 | Ayaz | .................... | H04L 5/0094 |
| 2021/0410215 A1* | 12/2021 | Kuo | ....................... | H04W 76/14 |
| 2022/0110077 A1* | 4/2022 | Abedini | ............ | H04W 56/0045 |
| 2022/0167296 A1* | 5/2022 | Park | ....................... | H04W 24/10 |
| 2022/0369256 A1* | 11/2022 | Ma | ....................... | H04W 56/004 |
| 2024/0187960 A1* | 6/2024 | Shimoda | ............... | H04W 40/02 |

* cited by examiner

Primary Examiner — Shah M Rahman
(74) Attorney, Agent, or Firm — Holland & Hart LLP

(57) ABSTRACT

Methods, systems, and devices for wireless communications are described. A first device may identify first sidelink communication timing of a first UE and a second sidelink communication timing of a second UE. The first UE and the second UE may be in communication with the first device. The first device may determine a sidelink timing offset to be used by the first device in repeating a sidelink message between the first UE and the second UE. The first device may determine the sidelink timing offset based at on the first sidelink communication timing and the second sidelink communication timing. The first device may repeat the sidelink message between the first UE and the second UE in accordance with the sidelink timing offset.

29 Claims, 16 Drawing Sheets

SIDELINK TIMING ADVANCE FOR A REPEATER

TECHNICAL FIELD

The following relates generally to wireless communications, and more specifically to sidelink timing advance for a repeater.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some examples, existing techniques for wireless communications via a repeater may be deficient.

SUMMARY

The described techniques relate to improved methods, systems, devices, and apparatuses that support sidelink timing advance for a repeater. For example, the described techniques provide for configuring a device with one or more rules for determining a sidelink timing offset to use for repeating sidelink messages between other communication devices, such as user equipments (UEs). In some examples, a first device may identify first sidelink communication timing of a first UE and a second sidelink communication timing of a second UE. The first UE and the second UE may be in communication with the first device. The first device may determine a sidelink timing offset to be used by the first device in repeating a sidelink message between the first UE and the second UE. The first device may determine the sidelink timing offset based at on the first sidelink communication timing and the second sidelink communication timing. The first device may repeat the sidelink message between the first UE and the second UE in accordance with the sidelink timing offset. Such techniques for sidelink timing advance for a repeater, as described herein, may therefore increase resource utilization with a wireless communications system, among other possible benefits.

A method for wireless communication at a first device is described. The method may include identifying a first sidelink communication timing of a first UE in communication with the first device and a second sidelink communication timing of a second UE in communication with the first device, determining, based on the first sidelink communication timing and the second sidelink communication timing, a sidelink timing offset to be used by the first device in repeating a sidelink message between the first UE and the second UE, and repeating the sidelink message between the first UE and the second UE in accordance with the sidelink timing offset.

An apparatus for wireless communication at a first device is described. The apparatus may include at least one processor, memory coupled (e.g., operatively, communicatively, functionally, electronically, or electrically) to the at least one processor, the memory storing instructions executable by the at least one processor to cause the first device to identify a first sidelink communication timing of a first UE in communication with the first device and a second sidelink communication timing of a second UE in communication with the first device, determine, based on the first sidelink communication timing and the second sidelink communication timing, a sidelink timing offset to be used by the first device in repeating a sidelink message between the first UE and the second UE, and repeat the sidelink message between the first UE and the second UE in accordance with the sidelink timing offset.

Another apparatus for wireless communication at a first device is described. The apparatus may include means for identifying a first sidelink communication timing of a first UE in communication with the first device and a second sidelink communication timing of a second UE in communication with the first device, means for determining, based on the first sidelink communication timing and the second sidelink communication timing, a sidelink timing offset to be used by the first device in repeating a sidelink message between the first UE and the second UE, and means for repeating the sidelink message between the first UE and the second UE in accordance with the sidelink timing offset.

A non-transitory computer-readable medium storing code for wireless communication at a first device is described. The code may include instructions executable by a processor to identify a first sidelink communication timing of a first UE in communication with the first device and a second sidelink communication timing of a second UE in communication with the first device, determine, based on the first sidelink communication timing and the second sidelink communication timing, a sidelink timing offset to be used by the first device in repeating a sidelink message between the first UE and the second UE, and repeat the sidelink message between the first UE and the second UE in accordance with the sidelink timing offset.

Some examples of the method, apparatuses, and non-transitory computer-readable medium described herein may further include operations, features, means, or instructions for determining that the first UE and the second UE may be synchronized and determining that the first sidelink communication timing of the first UE may be a same sidelink communication timing as the second sidelink communication timing of the second UE based on the first UE and the second UE being synchronized, where determining the sidelink timing offset to be used by the first device may be based on the first sidelink communication timing being the same sidelink communication timing as the second sidelink communication timing.

Some examples of the method, apparatuses, and non-transitory computer-readable medium described herein may further include operations, features, means, or instructions for receiving a message from a second device indicating that the first UE and the second UE may be synchronized, where determining that the first sidelink communication timing of the first UE may be the same sidelink communication timing as the second sidelink communication timing of the second UE may be based on receiving the message.

Some examples of the method, apparatuses, and non-transitory computer-readable medium described herein may further include operations, features, means, or instructions for determining that the first device may be synchronized to one or both of the first UE or the second UE, where determining that the first sidelink communication timing of the first UE may be the same sidelink communication timing as the second sidelink communication timing of the second UE may be based on determining that the first device may be synchronized to one or both of the first UE or the second UE.

Some examples of the method, apparatuses, and non-transitory computer-readable medium described herein may further include operations, features, means, or instructions for receiving reference signals from the first UE and the second UE, where determining that the first sidelink communication timing of the first UE may be the same sidelink communication timing as the second sidelink communication timing of the second UE may be based on performing one or more measurements on the reference signals received from the first UE and the second UE.

In some examples of the method, apparatuses, and non-transitory computer-readable medium described herein, the sidelink timing offset may be based on a switching gap and the sidelink timing offset may be measured from a downlink frame for repeating downlink messages.

Some examples of the method, apparatuses, and non-transitory computer-readable medium described herein may further include operations, features, means, or instructions for aligning the first sidelink communication timing and the second sidelink communication timing with an uplink frame for repeating uplink messages, where repeating the sidelink message between the first UE and the second UE in accordance with the sidelink timing offset may be based on the alignment, and where aligning the first sidelink communication timing and the second sidelink communication timing with the uplink frame includes, refraining from repeating the uplink messages in accordance with an uplink timing offset, repeating the sidelink message in accordance with a first sidelink timing offset, where the first sidelink timing offset may be based on the switching gap and the uplink timing offset, and where the first sidelink timing offset includes the sidelink timing offset, and repeating the sidelink message and the uplink messages in accordance with a second sidelink timing offset, where the second sidelink timing off may be based on an average of the switching gap and the uplink timing offset, and where the second sidelink timing offset includes the sidelink timing offset.

Some examples of the method, apparatuses, and non-transitory computer-readable medium described herein may further include operations, features, means, or instructions for aligning the first sidelink communication timing and the second sidelink communication timing with a downlink frame for repeating downlink messages, where repeating the sidelink message between the first UE and the second UE in accordance with the sidelink timing offset may be based on the alignment.

Some examples of the method, apparatuses, and non-transitory computer-readable medium described herein may further include operations, features, means, or instructions for aligning the first sidelink communication timing and the second sidelink communication timing with an uplink frame for repeating uplink messages, where repeating the sidelink message between the first UE and the second UE in accordance with the sidelink timing offset may be based on the alignment.

Some examples of the method, apparatuses, and non-transitory computer-readable medium described herein may further include operations, features, means, or instructions for transmitting, to the first UE and the second UE an indication indicating that the timing of the sidelink message may be aligned with the uplink frame for repeating the uplink messages, where repeating the sidelink message between the first UE and the second UE in accordance with the sidelink timing offset may be further based on transmitting the indication.

In some examples of the method, apparatuses, and non-transitory computer-readable medium described herein, a timing of the uplink frame may be based on a switching gap and an uplink timing offset and a difference between the sidelink timing offset and the timing of the uplink frame may be an integer number of symbols.

Some examples of the method, apparatuses, and non-transitory computer-readable medium described herein may further include operations, features, means, or instructions for receiving a message from a second device indicating the uplink timing offset and selecting the sidelink timing offset based on the difference between the sidelink timing offset and the timing of the uplink frame being the integer number of symbols.

Some examples of the method, apparatuses, and non-transitory computer-readable medium described herein may further include operations, features, means, or instructions for selecting the uplink timing offset and the sidelink timing offset, where the sidelink timing offset may be set to zero, and where selecting the uplink timing offset may be based on the difference between the sidelink timing offset and the timing of the uplink frame being the integer number of symbols.

Some examples of the method, apparatuses, and non-transitory computer-readable medium described herein may further include operations, features, means, or instructions for transmitting a first message to a second device indicating the uplink timing offset and receiving a second message from the second device enabling or disabling the uplink timing offset based on a value of the uplink timing offset.

Some examples of the method, apparatuses, and non-transitory computer-readable medium described herein may further include operations, features, means, or instructions for selecting the uplink timing offset and the sidelink timing offset based on determining a minimum misalignment between the timing of the uplink frame and the sidelink timing offset.

Some examples of the method, apparatuses, and non-transitory computer-readable medium described herein may further include operations, features, means, or instructions for determining that the first UE and the second UE may be not synchronized and determining that the first sidelink communication timing of the first UE may be different from the second sidelink communication timing of the second UE based on the first UE and the second UE not being synchronized, where determining the sidelink timing offset to be used by the first device may be based on the first sidelink communication timing being different from the second sidelink communication timing.

Some examples of the method, apparatuses, and non-transitory computer-readable medium described herein may further include operations, features, means, or instructions for aligning the first sidelink communication timing of the first UE with a reception timing and aligning the second sidelink communication timing of the second UE with a transmission timing, where determining the sidelink timing offset may be further based on the reception timing and the transmission timing.

Some examples of the method, apparatuses, and non-transitory computer-readable medium described herein may further include operations, features, means, or instructions for identifying a first difference between a timing of an uplink frame for transmitting uplink messages and the reception timing and a second difference between the timing of the uplink frame and the transmission timing, where determining the sidelink timing offset may be based on the first difference and the second difference.

Some examples of the method, apparatuses, and non-transitory computer-readable medium described herein may further include operations, features, means, or instructions for determining the sidelink timing offset based on, performing one or more measurements on signals received from the first UE and the second UE, and receiving an indication of the sidelink timing offset from a second device.

Some examples of the method, apparatuses, and non-transitory computer-readable medium described herein may further include operations, features, means, or instructions for synchronizing the first UE and the second UE to the first device based on determining that the first UE and the second UE may be not synchronized.

Some examples of the method, apparatuses, and non-transitory computer-readable medium described herein may further include operations, features, means, or instructions for transmitting a message to the first UE and the second UE indicating for the first UE and the second UE to synchronize to the first device and transmitting sidelink synchronization signals to the first UE and the second UE, where synchronizing the first UE and the second UE to the first device may be based on the sidelink synchronization signals.

Some examples of the method, apparatuses, and non-transitory computer-readable medium described herein may further include operations, features, means, or instructions for receiving a message from a second device indicating a sidelink timing advance command associated with repeating sidelink messages between the first UE and the second UE, where determining the sidelink timing offset to be used by the first device in repeating the sidelink message between the first UE and the second UE may be further based on the sidelink timing advance command.

DETAILED DESCRIPTION

Figure 1:
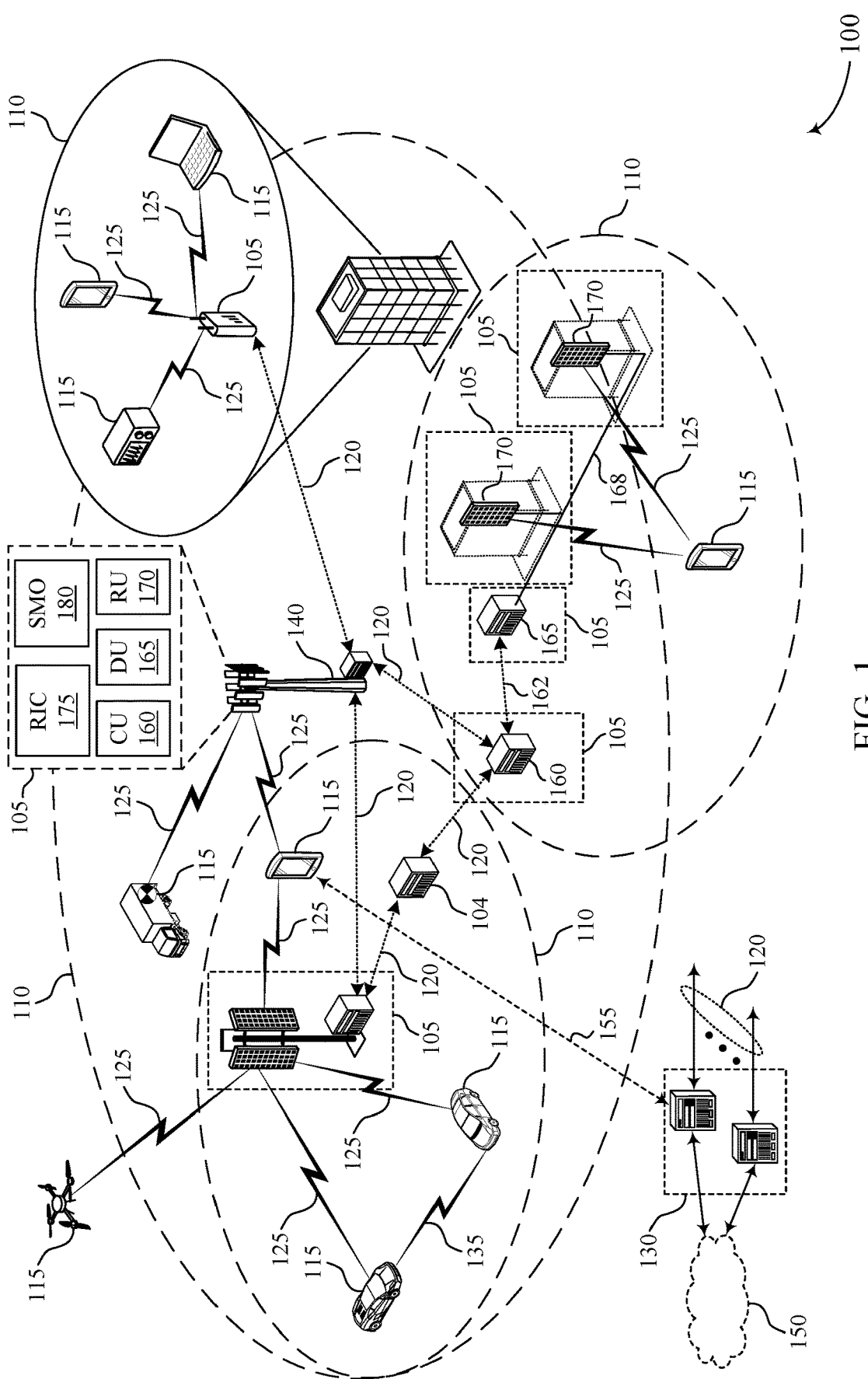
FIG. 1 illustrates an example of a wireless communications system that supports sidelink timing advance for a repeater in accordance with one or more aspects of the present disclosure.

Some wireless communications systems may be configured to support multiple-input, multiple-output (MIMO) communications at various frequency bands to enable increased throughput within the wireless communications systems. Communication devices operating within the wireless communications systems, such as user equipments (UEs) and network entities, may support beamforming to improve signal reliability and efficiency of MIMO communications. In some examples, a beamformed link between a UE and a network entity may be impacted by external factors, such as a physical blocking object, signal fading, or other phenomena. To support communications in the presence of such external factors, a wireless communications system may use additional wireless nodes that may be configured to route communications such that the external factors may be limited or avoided.

In some examples, wireless nodes used for routing communications between the network and UEs (or other communication devices) may be referred to as assisting nodes. In some examples, an assisting node may include an active or mostly passive (e.g., near passive) device. Example active devices may include active antenna units (AAUs), relays, or wireless repeaters, among other examples. Such devices may include active antennas and the supporting radio frequency circuitry (e.g., radio frequency components). For example, active devices may receive a signal from a transmitting device (e.g., a UE or a network entity) and actively retransmit the signal to a receiving device (e.g., a UE or a network entity). Example passive devices may include reconfigurable reflective surfaces, which may also be referred to as reconfigurable intelligent surfaces (RISs), intelligent reconfigurable surfaces (IRS), channel engineering devices (CEDs), or configurable deflectors, among other examples.

In some examples, an assisting node (e.g., a repeater) may be served by the network and used to forward (e.g., repeat, relay) signals (e.g., uplink signals, downlink signals) between UEs and the network via a Uu interface. In some examples, signals transmitted (e.g., forwarded) over the Uu interface may be referred to as Uu signals. The network may configure the repeater to forward Uu signals according to a timing (e.g., an uplink timing, a downlink timing, or both), such that the forwarded signals may be synchronized at the network (or the UEs). Additionally, or alternatively, the repeater may serve one or multiple UEs, such that the repeater may forward sidelink signals between two UEs via the PC5 interface. In some examples, the repeater may not be capable of determining how to align the timing of sidelink signals (e.g., to be forwarded between the two UEs) with Uu signals (e.g., to be forwarded between one or more UEs and the network).

Various aspects of the present disclosure relate to sidelink timing advance for a repeater and more specifically, to a framework for determining a sidelink timing offset for forwarding sidelink signals between multiple communication devices (e.g., UEs). For example, the repeater may be configured to identify a sidelink timing for each of two UEs that are served by the repeater (e.g., communicating with each other via sidelink communications relayed by the repeater). In some examples, based on the identified sidelink timing, the repeater may determine whether the two UEs are synchronized to each other, such that the UEs are using a same sidelink timing. Additionally, or alternatively, the repeater may determine whether the two UEs are synchronized to the network (e.g., the network entity serving the repeater), such that the sidelink timing of the two UEs may consider a switching gap of the network (e.g., a switching gap used by the network to transition between uplink signaling, downlink signaling, or sidelink signaling).

In some examples, based on the synchronization relationships identified for the two UEs, the repeater may follow one or more rules that define how the repeater may align sidelink communications to be forwarded between the two UEs. In some examples, such rules may be employed by the repeater to identify an offset for performing the alignment. For example, if the two UEs are synchronized to each other and are not synchronized to the network entity (e.g., the network entity serving the repeater), the repeater may use (e.g., apply) a timing offset for the sidelink signals (e.g., to be forwarded between the two UEs), such that the sidelink signals may be aligned with an uplink timing or a downlink timing used by the repeater for forwarding Uu signals between the UEs and the network. Additionally, or alternatively, if the two UEs are not synchronized, the repeater may apply a timing offset such that a receive timing of a sidelink signal (e.g., to be forwarded between the two UEs) may be aligned with an uplink timing associated with one UE and a transmit timing of the sidelink signal may be aligned with an uplink timing associated with the other UE. In some examples, the repeater may determine the timing offset based on measurements performed by the repeater or based on one or more timing commands from the network.

Particular aspects of the subject matter described herein may be implemented to realize one or more of the following potential advantages. For example, the techniques employed by the described communication devices may provide benefits and enhancements to wireless communication devices operating within the network, including enabling improved synchronization reliability within the wireless communication system. In some examples, operations performed by the described communication devices may provide improvements to techniques for sidelink repeating operations and increased resource utilization within the wireless communications system. The operations performed by the described communication devices to improve techniques for sidelink repeating operations may include configuring a repeater with a framework for determine a timing offset for forwarding sidelink signals between two communication devices. In some other implementations, operations performed by the described wireless communication devices may also support improvements to user experience and higher data rates, among other benefits.

Aspects of the disclosure are initially described in the context of wireless communications systems and a network architecture. Aspects of the disclosure are also described in the context of timing diagrams and a process flow. Aspects of the disclosure are further illustrated by and described with reference to apparatus diagrams, system diagrams, and flowcharts that relate to sidelink timing advance for a repeater.

FIG. 1 illustrates an example of a wireless communications system 100 that supports sidelink timing advance for a repeater in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support sidelink timing advance for a repeater as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support sidelink timing advance for a repeater. For example, a first device (e.g., a repeater) may identify first sidelink communication timing of a first UE 115 and a second sidelink communication timing of a second UE 115. The first UE 115 and the second UE 115 may be in communication with the first device. The first device may determine a sidelink timing offset to be used by the first device in repeating a sidelink message between the first UE 115 and the second UE 115. The first device may determine the sidelink timing offset based at on the first sidelink communication timing and the second sidelink communication timing. The first device may repeat the sidelink message between the first UE 115 and the second UE 115 in accordance with the sidelink timing offset. in some examples, by repeating the sidelink message in accordance with the sidelink timing offset, the first device may increase resource utilization with the wireless communications system 100, among other possible benefits.

Figure 2:
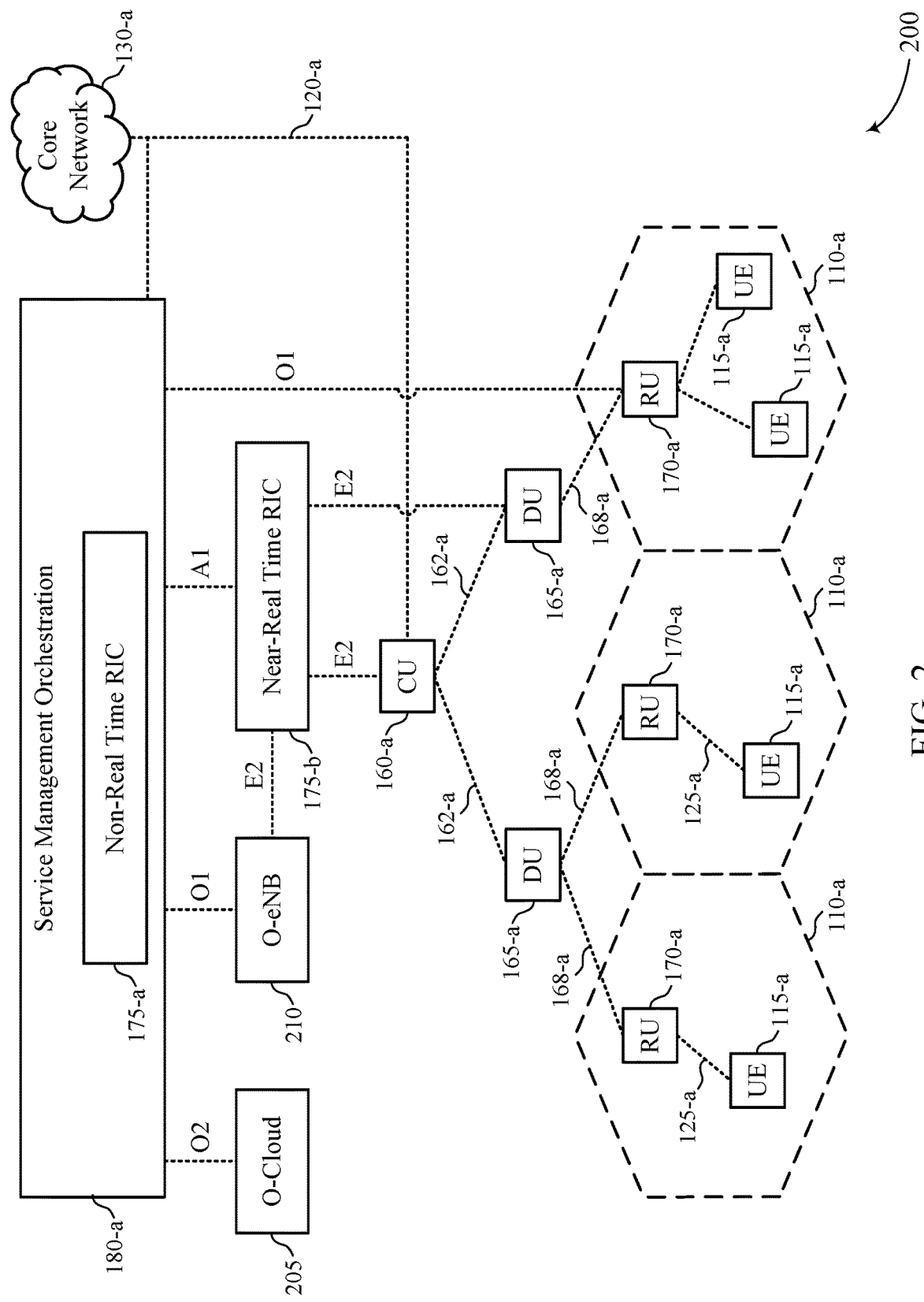
FIG. 2 illustrates an example of a network architecture that supports sidelink timing advance for a repeater in accordance with one or more aspects of the present disclosure.

FIG. 2 illustrates an example of a network architecture 200 that (e.g., a disaggregated base station architecture, a disaggregated RAN architecture) that supports sidelink timing advance for a repeater in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support sidelink timing advance for a repeater. For example, one or more network entities (e.g., a DU 165-*a*, a CU 160-*a*, or an RU 170-*a*) may configure a first device with one or more rules for determining a timing offset to use for repeating messages between two UEs 115-*a*. In the example of FIG. 2, the device may be an example of repeater which, in some examples, may be the RU 170. In some examples, the first device may identify first sidelink communication timing of a first UE 115-*a* and a second sidelink communication timing of a second UE 115-*a*. The first UE 115-*a* and the second UE 115-*a* may be in communication with the first device. The first device may determine a sidelink timing offset to be used by the first device in repeating a sidelink message between the first UE 115-*a* and the second UE 115-*a*. The first device may determine the sidelink timing offset based at on the first sidelink communication timing and the second sidelink communication timing. The first device may repeat the sidelink message between the first UE 115-*a* and the second UE 115-*a* in accordance with the sidelink timing offset. in some examples, by repeating the sidelink message in accordance with the sidelink timing offset, the first device may increase resource utilization with a wireless communications system, among other possible benefits.

Figure 3:
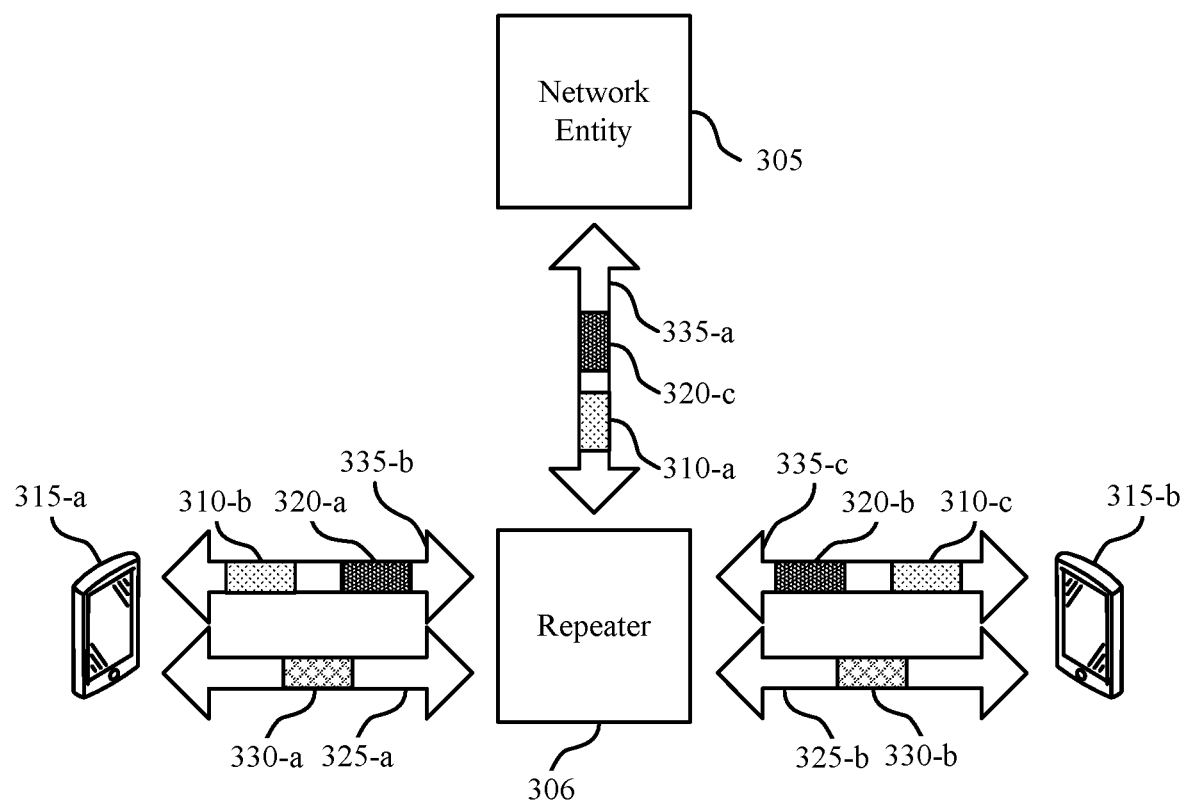
FIG. 3 illustrates an example of a wireless communications system that supports sidelink timing advance for a repeater in accordance with one or more aspects of the present disclosure.

FIG. 3 illustrates an example of a wireless communications system 300 that supports sidelink timing advance for a repeater in accordance with one or more aspects of the present disclosure. The wireless communications system 300 may implement or be implemented by one or more aspects of the wireless communications system 100 and the network architecture 200. For example, the wireless communications system 300 may include one or more UEs 315 (e.g., a UE 315-*a* and a UE 315-*b*) and a network entity 305, which may be examples of the corresponding devices as described with reference to FIGS. 1 and 2. The wireless communications system 300 may also include a repeater 306, which may be an example of an assisting node that may include an active or mostly passive (e.g., near passive) device. In some examples of the wireless communications system 300, the repeater 306 may be an example of an RU 170 as described with reference to FIGS. 1 and 2.

The wireless communications system 300 may support the use of assisting nodes, such as the repeater 306, to extend coverage to areas that may otherwise be uncovered. For example, the network (e.g., the network entity 305) may employ the repeater 306 to route wireless communications between the UEs 315 and the network entity 305, such that the external factors that may impact wireless communications between the UEs 315 and the network may be limited or avoided. In the example of FIG. 3, the repeater 306 may be an example of any nodes capable of forwarding communications between communication devices, such as a smart repeater, a radio frequency repeater, or a passive reflector (e.g., a RIS or a IRS), among other examples.

In some examples, through control (e.g., smart control) of repeating (e.g., repeating operations) via the repeater 306, the network entity 305 may improve signal coverage and reduce signal interference (e.g., improve the signal to interference plus noise ratio (SINR)) within the wireless communications system 300. That is, the repeater 306 (e.g., a smart repeater) may provide one or more coverage enhancements to the wireless communications system 300 (e.g., an NR system, a system operating over relatively high radio frequency bands, a system operating over mmWave radio frequency bands). In some examples, the network entity 305 may control repeating operations (e.g., relaying, forwarding) of the repeater 306 via side control information. For example, the repeater 306 (or other smart repeaters) may be provided side control information (e.g., by the network entity 305 or another controlling device) to improve efficiency of repeating operations (e.g., for relatively efficient operation). In some examples, side control information provided to the repeater 306 may include TDD awareness information, activation and deactivation information (e.g., ON-OFF information, power control information), and spatial information (e.g., beam selection information), among other examples.

In some examples, the repeater 306 may include one or more functionalities that may use different amounts (or types) of processing. For example, repeating operations performed by the repeater 306 may occur via multiple (e.g., different) signal processing pathways. That is, the repeater may perform the repeating operation using multiple (e.g., different) combinations of radio frequency components (e.g., high-fidelity or low-fidelity components). In some examples, a signal processing pathway (e.g., a splitting option) used by the repeater for a repeating operation may depend on an amount (or type) of processing to be performed on an incoming signal. For example, the repeater 306 may use one splitting option to forward an analog signal and another splitting option to obtain time domain (or frequency domain) in-phase and quadrature (IQ) samples (e.g., to perform IQ sampling). Additionally, or alternatively, the repeater 306 may use different splitting options for performing repeating operations at different layers. For example, the repeater 306 may use one splitting option for performing lower layer repeating and another splitting option for performing higher layer (e.g., MAC layer) repeating. In some examples, the repeating operation performed by the repeater 306 may depend on how the signal is processed by the network (e.g., the network entity 305, one or more other network entities serving the repeater 306). Additionally, or alternatively, the repeating operation performed by the repeater may depend on the radio frequency components of the repeater. In some examples, repeating operations for uplink signal, downlink signals, and sidelink signals may be symmetric.

Additionally or alternatively, the repeater 306 may be capable of performing one or more relaying operations. In some examples, the repeater may select one or more splitting options (e.g., signal processing pathways, combinations of radio frequency components) based on the type of signal (e.g., whether the signal is an uplink signal or a downlink signal) and how the signal is processed by the network. For example, the repeater 306 may select one splitting option for higher layer relaying operations (e.g., MAC layer relaying operations) and other splitting options for obtaining codewords, performing frequency domain IQ sampling, or performing time domain IQ sampling, among other examples.

In some examples, the repeater 306 may be capable of forwarding both Uu signals (e.g., downlink signals and uplink signals) between the network entity 305 and the UEs 315 and sidelink signals between the UE 315-*a* and the UE 315-*b*. For example, the repeater 306 (e.g., an assisting node, a RIS, an IRS, a lower-layer relay, a digital repeater) may be configured (e.g., by the network entity 305) for forwarding downlink signaling 310 (e.g., downlink signaling 310-*a*, downlink signaling 310-*b*, and downlink signaling 310-*c*) and uplink signaling (e.g., uplink signaling 320-*a*, uplink signaling 320-*b*, and uplink signaling 320-*c*) between the UEs 315 and the network entity 305 via a Uu interface, such as via one or more Uu links (e.g., a Uu link 335-*a*, a Uu link 335-*b*, and a Uu link 335-*c*). Additionally, or alternatively, the repeater 306 may be used for forwarding sidelink signaling 330 (e.g., sidelink signaling 330-*a* and sidelink signaling 330-*b*) between the UE 315-*a* and the UE 315-*b* via a PC5 interface, such as via one or more PC5 links (e.g., a PC5 link 325-*a* and a PC5 link 325-*b*).

In some examples, while the repeater 306 may be in coverage (IC) of the network (e.g., controlled by the network entity 305), one or more of the UEs served by the repeater 306 may be IC or may not be IC of the network. For example, one or both of the UE 315-*a* and the UE 315-*b* may be IC of the network entity 305 or out-of-coverage (OoC) of the network entity 305. In some examples, the UE 315-*a* and the UE 315-*b* may both be IC of the network entity 305 and served by the repeater 306 (e.g., on the sidelink), the UE 315-*a* may be IC of the network entity 305 and served by the repeater 306 while the UE 315-*b* may be OoC of the network entity 305 and served by the repeater 306, or the UE 315-*a* and the UE 315-*b* may both be OoC of the network entity 305 and served by the repeater 306. In such examples, the repeater 306 may be synchronized to the network entity 305 (e.g., a gNB) with a relatively well established timing (e.g., downlink timing and uplink timing) for forwarding Uu signals (e.g., uplink signals and downlink signals), but may not be capable of determining how to align the timing of sidelink signals (e.g., to be forwarded between the two UEs 315) with the Uu signals (e.g., forwarded between one or more UEs 315 and the network entity 305).

For example, a timing used by the UEs 315 for transmitting sidelink signaling 330 (e.g., a sidelink timing) may depend on whether the UEs 315 are IC of the network entity 305 (e.g., may depend on an operation mode of the UEs 315). In some examples, the timing for sidelink transmissions at the UEs 315 may depend on whether the UEs 315 are operating in a first mode in which the UEs 315 are IC of the network entity 305 (e.g., a gNB) or a second mode in which the UEs are OoC of the network entity 305. For example, if the UEs 315 are IC of the network entity 305 (e.g., if the UEs 315 are operating in the first mode), resource allocation for sidelink communications by the UEs 315 (e.g., resources allocation for transmitting the sidelink signaling 330) may be granted (e.g., scheduled) by the network entity 305. In such an example, the UEs 315 may be configured to transmit sidelink signaling 330, such that a frame of a sidelink transmission (e.g., a sidelink frame) may be aligned with a reference timing configured by the network, such as a timing reference radio frame, a downlink frame, or another downlink timing, among other examples.

In some examples, if the UEs 315 are IC of the network entity 305, the network entity 305 may configure the UEs 315 to align the sidelink frame with the downlink timing (e.g., the timing reference radio frame, the downlink frame) using a sidelink timing advance command ($N_{TA,SL}$) and a timing advance offset ($N_{TA,offset}$). In some examples, the timing advance offset may be configured by the network (e.g., indicated from the cell) to enable the network an amount of time (e.g., a switching gap) for transitioning between uplink communications, downlink communications, and sidelink communications. That is, if the UEs 315 are IC, the UEs 315 may apply a switching gap configured by the network entity 305 for transmitting and receiving sidelink signals. In some examples, a value of the switching gap (e.g., 0, 7, 13, or 20) may be based on an implementation of the UE, a cell-specific value that may depend on a radio frequency band configured for the UEs 315 (e.g., FR1 or FR2) or whether the UEs 315 are operating in a TDD or FDD system, among other examples. Additionally, or alternatively, the downlink timing may be based on a reception timing (e.g., at time at which downlink signals are received from the network entity 305). For example, the reception timing may be based on a distance between the UEs 315 and the network entity 305. That is, the reception timing may depend on (e.g., account for) a propagation delay associated with transmitting signals between the UEs 315 and the network entity 305.

Additionally or alternatively, if the UEs 315 are OoC of the network entity 305 (e.g., if the UEs 315 are operating in the second mode), sidelink communications by the UEs 315 may be scheduled via the UEs 315. For example, sidelink communications may be scheduled by via the UEs 315 based on channel sensing procedures (e.g., a channel access procedure, a listen-before-talk (LBT) procedure) performed by the UEs 315. In such an example, the timing for sidelink transmissions (e.g., by the UEs 315) may be obtained by the UEs 315 from a synchronization source. For example, if the UEs 315 are OoC, the UEs 315 may use a sidelink timing from a synchronization source. A synchronization source may include the network entity 305 (e.g., the gNB), a global navigation satellite system (GNSS), or another UE (e.g., an IC UE or another OoC UE), among other examples. In such an example, the sidelink timing may not account for (e.g., consider) a switching gap (or a timing advance command) associated with the network. In some examples (e.g., using a sidelink timing from the synchronization source), the UEs 315 may transmit the sidelink signaling 330, such that a frame of a sidelink transmission (e.g., a sidelink frame) may be aligned with a downlink frame configured by the network.

In some examples, because the sidelink timing of the UEs 315 may depend on an operation mode of the UEs 315, the repeater may not be capable of determining how to align the timing of sidelink signals (e.g., what timing to apply to sidelink signals to be forwarded between the UE 315-*a* and the UE 315-*b*) with Uu signals (e.g., uplink signals or downlinks signals to be forwarded between the UE 315-*a* or the UE 315-*b* and the network entity 305). In some examples, by providing a framework for determining a timing offset for forwarding sidelink signals between multiple UEs (e.g., the UE 315-*a* and the UE 315-*b*), techniques for sidelink timing advance for a repeater, as described herein, may provide one or more enhancements to sidelink repeating operations.

For example, the repeater 306 may be configured to identify a sidelink timing for the UE 315-*a* and the UE 315-*b*. In some examples, based on the identified sidelink timing, the repeater 306 may determine whether the UEs 315 are synchronized to each other (e.g., whether the UEs 315 are using a same sidelink timing) and whether the UEs 315 are synchronized to the network entity 305 (e.g., the network entity serving the repeater). In some examples, based on the synchronization relationships identified for the UEs 315, the repeater 306 may follow one or more rules that define how the repeater 306 may align the sidelink signaling 330. For example, the repeater 306 my use the one or more rules to identify a timing offset for performing the alignment.

In some examples, the repeater 306 may identify (e.g., determine) a sidelink timing for the UEs 315 based on receiving a sidelink timing advance command (e.g., from the network entity 305) or based on a configuration for determining the sidelink timing (e.g., a pre-configuration for determining a sidelink transmit timing or a sidelink receive timing). In some examples, the network entity 305 (e.g., the gNB) may send the sidelink timing command to the repeater 306 based on an IC or an OoC report indicated to the network (e.g., by the UEs 315). For example, a UE 315 may receive (e.g., acknowledge receipt of, use resources allocated by) a sidelink grant from the network entity 305 and, as such, the network entity 305 may determine that the UE 315 is IC. In some examples, the sidelink timing advance command may be sent to the repeater 306 by the UE 315-*a*, the UE 315-*b*, both the UE 315-*a* and the UE 315-*b*, or another control entity (e.g., an RSU or a programmable logic controller (PLC)) that may control multiple nodes (e.g., UEs 315). In some examples, the sidelink timing advance command may be configured (e.g., pre-configured) for a number (e.g., three) different timing advance modes, such as both UEs 315 being IC, both UEs 315 being OoC, or one UE 315 being IC and the other UE 315 being OoC. In some examples, IC and OoC may be defined on the sidelink band. For example, the UEs 315 may be IC for a radio frequency band used for transmitting signals over the Uu interface (e.g., for an NR band) and OoC for a radio frequency band used for transmitting sidelink signals (e.g., a sidelink band).

As illustrated in the example of FIG. 3, the repeater 306 may identifying a first sidelink timing (e.g., a first sidelink communication timing) of the UE 315-*a* (e.g., a UE 315 that is communication with the repeater 306). Additionally, or alternatively, the repeater 306 may identify a second sidelink communication timing of the UE 315-*b* (e.g., another UE 315 in communication with the repeater 306). In some examples, the repeater 306 may determine a sidelink timing offset to be used by the repeater 306 in repeating a sidelink message (e.g., the sidelink signaling 330) between the UE 315-*a* and the UE 315-*b*. The repeater 306 may determine the sidelink timing offset based on the first sidelink communication timing and the second sidelink communication timing. The repeater 306 may repeat the sidelink signaling 330 between the UE 315-*a* and the UE 315-*b* in accordance with the sidelink timing offset. In some examples, by repeating the sidelink signaling 330 in accordance with the sidelink timing offset, the repeater 306 may increase synchronization reliability within the wireless communications system 300, among other possible benefits.

Figure 4A:
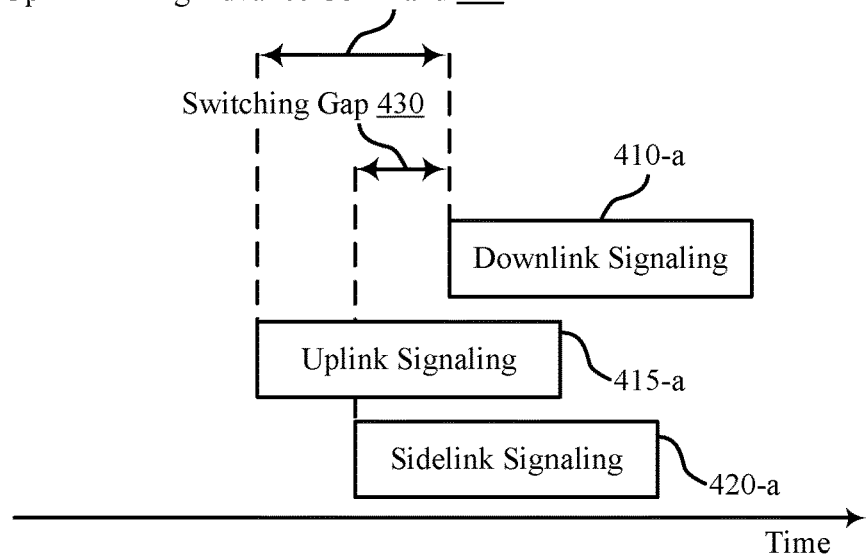
FIGS. 4A, 4B, 5, and 6 each illustrates an example of a timing diagram that supports sidelink timing advance for a repeater in accordance with one or more aspects of the present disclosure.
Figure 4B:
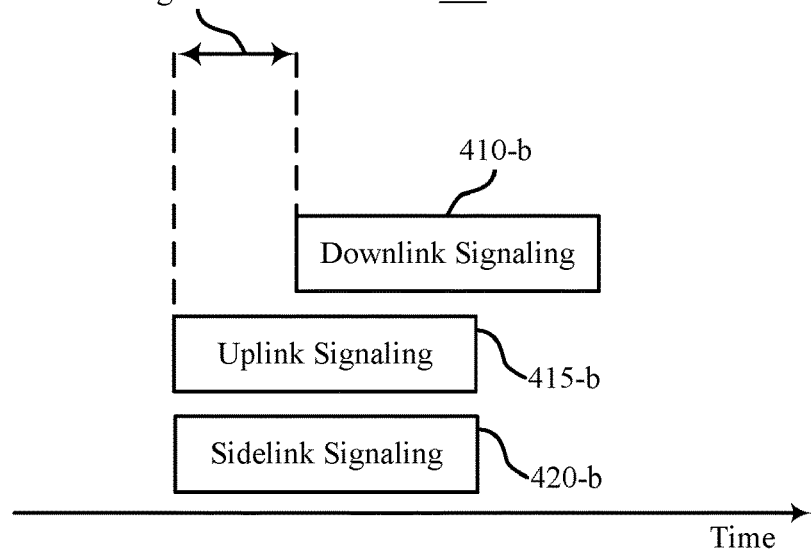

FIGS. 4A and 4B each illustrates an example of a timing diagram 400 that supports sidelink timing advance for a repeater in accordance with one or more aspects of the present disclosure. The timing diagrams 400 (e.g., a timing diagram 400-*a* and a timing diagram 400-*b*) may implement or be implemented by one or more aspects of the wireless communications systems 100 and 300 and the network architecture 200. For example, the timing diagrams 400 may be implemented by one or more UEs and a network entity, which may be examples of the corresponding devices as described with reference to FIGS. 1 through 3. The timing diagrams 400 may also include a repeater, which may be an example of an assisting node that may include an active or mostly passive (e.g., near passive) device. In some examples, the repeater may be an example of an RU 170 as described with reference to FIGS. 1 and 2.

A wireless communications network may configure a repeater with a framework for determining a timing offset for forwarding sidelink signals between multiple communication devices (e.g., UEs). For example, the repeater may be configured to identify a sidelink timing for at least two UEs that are served by the repeater (e.g., communicating with each other via sidelink communications relayed by the repeater). In some examples, based on the identified sidelink timing, the repeater may determine whether the two UEs are synchronized to each other, such that the UEs are using a same sidelink timing. Additionally, or alternatively, the repeater may determine whether the two UEs are synchronized to the network (e.g., the network entity serving the repeater), such that the sidelink timing of the two UEs may consider a switching gap of the network. In some examples, the switching gap may be an example of a switching gap as described with reference to FIG. 3. For example, the switching gap may be used by the network to transition between uplink signaling, downlink signaling, or sidelink signaling. In some examples, the repeater may determine how to align the sidelink communications to be forwarded between the two UEs based on the identified synchronization relationships (e.g., whether the UEs are configured with a same sidelink timing). For example, based on the identified synchronization relationships, the repeater may determine a sidelink timing offset for aligning sidelink communications to be forwarded between the UEs.

In the example of FIG. 4A, a first UE and a second UE (e.g., served by the repeater) may be synchronized to each other and the network entity (e.g., a network entity serving the repeater). For example, the first UE and the second UE may both be IC of the network entity, the first UE and the second UE may both be OoC and synchronized to a synchronization source that uses a same cell timing as the network entity, or the first UE may be IC of the network entity and the second UE may be OoC and synchronized to the first UE. In such an example, the first UE and the second UE may use (e.g., be configured with) a sidelink timing (e.g., a same sidelink timing) that considers the switching gap. For example, as illustrated in the example of FIG. 4A, the first UE and the second UE may transmit sidelink communications, such that the sidelink signaling 420-a (e.g., a sidelink frame) may consider a switching gap 430. That is, the sidelink signaling 420-a may be transmitted in advance of downlink signaling 410-a (e.g., a frame of a downlink transmission) by an amount of time that may correspond to the switching gap 430.

In some examples, the repeater may identify a sidelink timing of the first UE and the second UE (e.g., a same sidelink timing with the switching gap 430) based on an indication (e.g., from the network) or based on measurements performed by the repeater, among other examples. For example, the repeater may be informed of the sidelink timing for the first UE and the second UE by the network (e.g., a gNB), the first UE, the second UE, or one or more other nodes (e.g., controlling the repeater). Additionally, or alternatively, the repeater may be synchronized to a same synchronization source as the first UE or the second UE (or both). In such an example, the repeater may determine the sidelink timing for the first UE and the second UE based on the synchronization. In some examples, the repeater may infer (e.g., determine) the sidelink timing for the first UE and the second UE based on measurements (e.g., RSRP measurements) performed by the repeater, for example on sidelink reference signals (e.g., demodulation reference signals (DMRS), CSI-RS) transmitted from the first UE and the second UE.

As illustrated in the example of FIG. 4A, the repeater may align a sidelink timing (e.g., a timing for forwarding sidelink signals between the first UE and the second UE) to the first UE and the second UE (e.g., to an uplink timing or a downlink timing associated with the first UE and the second UE). For example, the repeater may maintain a timing for uplink signaling 415-a, a timing for the downlink signaling 410-a, and a timing for the sidelink signaling 420-a (e.g., the sidelink timing). In some examples, the timing for the uplink signaling 415-a may be based on an uplink timing advance command 426. For the sidelink signaling 420-a, the repeater may consider the switching gap 430. For example, the repeater may determine a sidelink timing offset to apply to the sidelink timing (e.g., relative to the downlink signaling 430-a) and the sidelink timing offset may be based on the switching gap 430. In such an example, the sidelink timing offset may not impact the sidelink timing of the first UE and the second UE. In some examples, however, the sidelink timing offset (e.g., based on the switching gap 430) may lead to a mis-alignment of the uplink signaling 415-a (e.g., forwarded between the first UE or the second UE and the network based on the uplink timing advance command 426) and the sidelink signaling 420-a (e.g., forwarded between the first UE and the second UE). In some examples, such a mis-alignment may lead to interference.

In some examples, as illustrated in the example of FIG. 4B, the repeater may align the sidelink timing with an uplink timing (e.g., configured by the network), such that interference between uplink signaling 415-b and sidelink signaling 420-b (e.g., forwarded by the repeater) may be reduced. In some examples, the repeater may align the sidelink timing with the uplink timing by refraining from applying the uplink timing advance command 426 (e.g., indicated to the repeater by the network) for the uplink signaling 415-b. In such examples, the network (e.g., the gNB) may determine that the repeater refrained from applying the uplink timing advance command 426 if the uplink signaling 415-b is repeated (e.g., relayed) by the repeater overlaps with the sidelink signaling 420-b (e.g., repeated or relayed by the repeater). In response, the network may adjust the reception of the uplink signaling 415-b. Additionally, or alternatively, the repeater may transmit a message to the network indicating that the repeater refrained from applying the uplink timing advance command 426 to the uplink signaling 415-b (e.g., for uplink transmissions that overlap with sidelink repeating).

In other examples, the repeater may align the sidelink timing with the uplink timing by applying the uplink timing advance command 426 to the sidelink signaling 420-b (e.g., a sidelink frame). In such an example, the first UE and the second UE may be informed (e.g., by the network or another controlling entity) to adjust the sidelink timing (e.g., according to the uplink timing advance command). Additionally, or alternatively, the repeater may align the uplink timing and the sidelink timing by applying a same timing advance command (e.g., a sidelink timing advance command 425) to the uplink signaling 415-b (e.g., an uplink frame) and the sidelink signaling 420-b (e.g., a sidelink frame). In such an example, the sidelink timing advance command 425 may include the switching gap 430 and may be applied relative to the downlink signaling 410-b (e.g., a downlink frame). For example, the sidelink timing advance command 425 may include a value of the switching gap 430 that may correspond to approximate half of the uplink timing advance command 426 (e.g., indicated for the uplink signaling 415-b). In some examples, by aligning the sidelink signaling 420-b with the uplink signaling 415-b, the repeater may reduce interference experienced by the repeater (e.g., due to mis-alignments), among other possible benefits.

Figure 5:
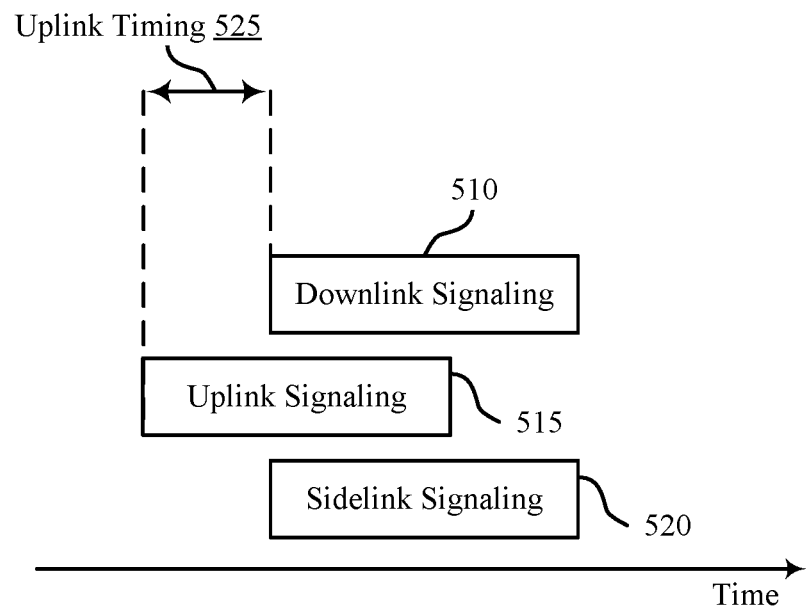

FIG. 5 illustrates an example of a timing diagram 500 that supports sidelink timing advance for a repeater in accordance with one or more aspects of the present disclosure. The timing diagrams 500 may implement or be implemented by one or more aspects of the wireless communications systems 100 and 300 and the network architecture 200. For example, the timing diagrams 500 may be implemented by one or more UEs and a network entity, which may be examples of the corresponding devices as described with reference to FIGS. 1 through 3. The timing diagrams 500 may also include a repeater, which may be an example of an assisting node that may include an active or mostly passive (e.g., near passive) device. In some examples, the repeater may be an example of an RU 170 as described with reference to FIGS. 1 and 2.

As illustrated in the example of FIG. 5, a wireless communications network may configure a repeater with a framework for determining a timing offset for forwarding sidelink signals between multiple communication devices (e.g., UEs). In some examples, the repeater may determine how to align the sidelink communications to be forwarded between the two UEs based on an operation mode (e.g., a state) of the UEs. For example, the repeater may determine how to align the sidelink communications to be forwarded between the two UEs based on whether the UEs are operating in a first mode in which the UEs may be IC of (e.g., synchronized to) the network entity serving the repeater or a second mode in which the UEs may be OoC of (e.g., unsynchronized to) the network entity serving the repeater.

In some examples, a first UE and a second UE served by the repeater may both be OoC of the network entity serving the repeater. For example, the first UE and the second UE may be synchronized to the GNSS. In such an example, the first UE and the second UE may use a same sidelink timing that may not consider (e.g., without) a switching gap of the network (e.g., the network entity serving the repeater). In some examples, the repeater may identify a sidelink timing for the first UE and the second UE (e.g., a same sidelink timing without the switching gap) based on measurements performed by the repeater (e.g., on DMRS or CSI-RS transmitted from the first UE and the second UE) or based on sidelink messages (e.g., explicit sidelink messages) exchanged between the repeater and the first UE or the second UE (or both). For example, the first UE or the second UE (or both) may inform the repeater about the synchronization source (e.g., the GNSS, the network entity, an IC UE, or another OoC UE) of the first UE or the second UE (or both).

As illustrated in the example of FIG. 5, the repeater may apply a same sidelink timing for the first UE and the second UE. For example, the repeater may apply a sidelink timing, such that sidelink signaling 520 may be aligned to downlink signaling 510 (e.g., a downlink frame) without a switching gap or an uplink timing advance command. In such an example, interference between uplink signaling 515 and the sidelink signaling 520 (e.g., mutual sidelink and uplink interference) may occur, for example due to mis-alignment (e.g., in time) of the uplink signaling 515 and the sidelink signaling 520. Additionally, or alternatively, the repeater may align the uplink signaling 515 and the sidelink signaling 520, such that inference (e.g., for joint uplink and sidelink forwarding at the repeater) may be reduced. In such an example, the first UE and the second UE may be informed of the sidelink timing at the repeater. For example, the transmitting UE (e.g., the first UE) may adjust the timing at which the first UE transmits the sidelink signaling 520 (e.g., a sidelink message) to the repeater for forwarding. Additionally, or alternatively, the receiving UE (e.g., the second UE) may adjust the timing at which the second UE receives the forwarded sidelink message from the repeater. In such an example, interference from other sidelink message (e.g., transmitted from other UEs served by the repeater) may occur, for example due to mis-aligned sidelink timing (e.g., of the other UEs relative to the first UE and the second UE).

In some examples, the repeater may apply a sidelink timing such that the sidelink signaling 520 and the uplink signaling 515 may be aligned in symbols (e.g., a symbol of the sidelink signaling 520 may be aligned with a symbol of the uplink signaling 515). For example, uplink timing 525 (e.g., a timing of the uplink signaling 515) may be based on a switching gap (e.g., of the network entity serving the repeater) and an uplink timing advance command (e.g., configured by the network entity serving the repeater) and the sidelink timing may be based on a sidelink timing advance command. In such an example, the uplink timing advance command, the sidelink timing advance command, or both, may be determined (e.g., chosen by the repeater), such that a difference between the uplink timing 525 (e.g., the switching gap and the uplink timing advance command) and the sidelink timing (e.g., the sidelink timing advance command) may be an integer multiple of a symbol (e.g., an integer multiple of one OFDM symbol duration). In some examples, the repeater may determine to use the uplink timing advance command indicated by the network and may determine (e.g., choose, select) a sidelink timing advance command, such that interference between the uplink signaling 515 and the sidelink signaling 520 (e.g., multiple sidelink transmissions) may be reduced.

Additionally or alternatively, as illustrated in the example of FIG. 5, the repeater may determine (e.g., choose, select) an uplink timing advance command and may set the sidelink timing advance command to approximately zero, such that interference between the uplink signaling 515 and the sidelink signaling 520 (e.g., multiple sidelink transmissions) may be reduced. That is, the repeater may select the uplink timing offset and the sidelink timing offset based on determining a minimum misalignment (or an otherwise suitable misalignment) between the timing of the uplink signaling 515 (e.g., an uplink frame) and the sidelink timing offset. In such examples, the repeater may indicate the determined uplink timing advance command (e.g., the uplink timing 525) to the network (e.g., the gNB) and the network may enable or disable the indicated uplink timing advance command for the repeater (or the UEs). Additionally, or alternatively, the repeater may determine an uplink timing advance command and a sidelink timing advance command (e.g., may jointly select the uplink timing advance command and a sidelink timing advance command) such as to balance (e.g., manage, determine a compromise) interference between different signaling (e.g., interference between the uplink signaling 515 and other uplink signaling, interference between the uplink signaling 515 and the sidelink signaling 520, and interference between the sidelink signaling 520 and other sidelink signaling) that may be mis-aligned. In some examples, by balancing interference at the repeater (e.g., interference due to timing mis-alignments), the repeater may improve user experience and increase data rates, among other possible benefits.

Figure 6:
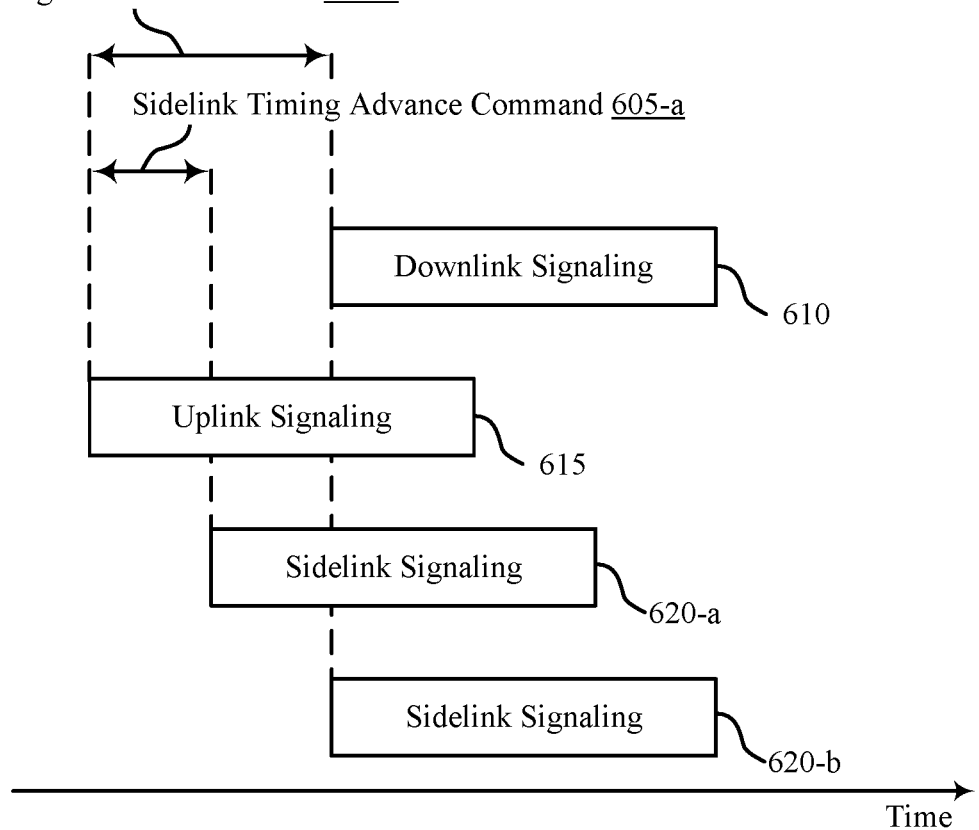

FIG. 6 illustrates an example of a timing diagram 600 that supports sidelink timing advance for a repeater in accordance with one or more aspects of the present disclosure. The timing diagrams 600 may implement or be implemented by one or more aspects of the wireless communications systems 100 and 300 and the network architecture 200. For example, the timing diagrams 600 may be implemented by one or more UEs and a network entity, which may be examples of the corresponding devices as described with reference to FIGS. 1 through 3. The timing diagrams 600 may also include a repeater, which may be an example of an assisting node that may include an active or mostly passive (e.g., near passive) device. In some examples, the repeater may be an example of an RU 170 as described with reference to FIGS. 1 and 2.

In some examples, the repeater may determine how to align the sidelink communications to be forwarded between the two UEs based on whether the UEs are operating in a first mode in which the UEs may be IC of (e.g., synchronized to) the network entity serving the repeater or a second mode in which the UEs may be OoC of (e.g., unsynchronized to) the network entity serving the repeater. For example, the repeater may be configured to determine a timing offset (e.g., sidelink timing offset) for forwarding sidelink signals between UEs served by the repeater and the timing offset may depend on a state (e.g., operation mode) of the served UEs. In some examples, a first UE and a second UE served by the repeater may be synchronized to multiple (e.g., different) synchronization sources. Additionally, or alternatively, the first UE may be synchronized to the network, while the second UE may be synchronized to the GNSS. In such examples, the first UE and the second UE may use (e.g., be configured with) different sidelink timings. For example, the first UE may be configured with a first sidelink timing for transmitting sidelink signaling 620-*a* and a second UE may be configured with a second sidelink timing for transmitting sidelink signaling 620-*b*. In some examples, a sidelink signaling 620-*b* may be aligned with downlink signaling 610.

In some examples, if a sidelink timing difference between the first UE and the second UE is relatively small or relatively moderate, the first UE and the second UE may communicate (e.g., via the repeater), while experiencing interference (e.g., a reduced amount of interference that may be associated with the relatively small or relatively moderate sidelink timing difference) between uplink signaling 615 and the sidelink signaling (e.g., the sidelink signaling 620-*a* and the sidelink signaling 620-*b*). Additionally, or alternatively, if a sidelink timing difference between the first UE and the second UE is relatively large, the first UE and the second UE may not be capable of communicating via the repeater (e.g., due to an increased amount of interference that may be associated with the relatively large sidelink timing difference). In such an example, the repeater may use different sidelink timings for transmitting and receiving sidelink communications (e.g., forwarding sidelink communications) between the first UE and the second UE. For example, the repeater may use a reception timing that may be aligned to the first UE (e.g., a sidelink timing of the first UE), while using a transmission timing that may be aligned to the second UE (e.g., a sidelink timing of the second UE). In such an example, a sidelink timing advance command for receiving sidelink communications at the repeater (e.g., a sidelink timing advance command 605-*a*) and a sidelink timing advance command for transmitting sidelink communications (e.g., a sidelink timing advance command 605-*b*) from the repeater may be determined (e.g., chosen) by the repeater. In some examples, the sidelink timing advance commands 605 may be determined by the repeater based on measurements (e.g., performed by the repeater on signals transmitted from the first UE and the second UE) or based on commands from a controlling entity, such as an RSU or a PLC, among other examples.

In some examples, by using the sidelink timing advance command 605-*a* for receiving sidelink signaling 620-*a* and the sidelink timing advance command 605-*b* for transmitting sidelink signaling 620-*b*, the repeater may enable sidelink communications between the first UE and the second UE (e.g., via the repeater). Additionally, or alternatively, the repeater may apply an uplink timing advance command and a sidelink timing advance command (e.g., another sidelink timing advance command) to align the uplink signaling 615 and the sidelink signaling 620 (e.g., the sidelink signaling 620-*a*, the sidelink signaling 620-*b*). For example, based on a timing differences between the uplink signaling 615 and the sidelink signaling 620-*a* and a timing difference between the uplink signaling 615 and the sidelink signaling 620-*b* the repeater may apply the uplink timing advance command and the sidelink timing advance command to align the uplink signaling 615 with the sidelink signaling 620-*a* or the sidelink signaling 620-*b* (or both).

In some examples, the repeater may align sidelink signaling (e.g., a sidelink frame), such as the sidelink signaling 620-*a* or the sidelink signaling 620-*b*) with uplink signaling 615 (e.g., an uplink frame) by refraining from applying an uplink timing advance command (e.g., indicated to the repeater by the network), by applying the uplink timing advance command to the sidelink signaling (e.g., the sidelink signaling 620-*a*, the sidelink signaling 620-*b*), or by applying a same timing advance command (e.g., a same sidelink timing advance command) to the uplink signaling 615 (e.g., an uplink frame) and the sidelink signaling (e.g., the sidelink signaling 620-*a*, the sidelink signaling 620-*b*), among other examples. Additionally or alternatively, the repeater may become a synchronization source for the first UE and the second UE. In such an example, the repeater may inform the first UE and the second UE that the repeater is to become a synchronization source for the first UE and the second UE. Additionally, or alternatively, the repeater may transmit sidelink synchronization signals (e.g., SSBs) to the first UE and the second UE. The first UE and the second UE may use the SSBs (e.g., transmitted from the repeater) to become synchronized to the repeater. In some examples, by enabling communications between the first UE and the second UE, the repeater may increase throughput and resource utilization within the wireless communications system, among other possible benefits.

Figure 7:
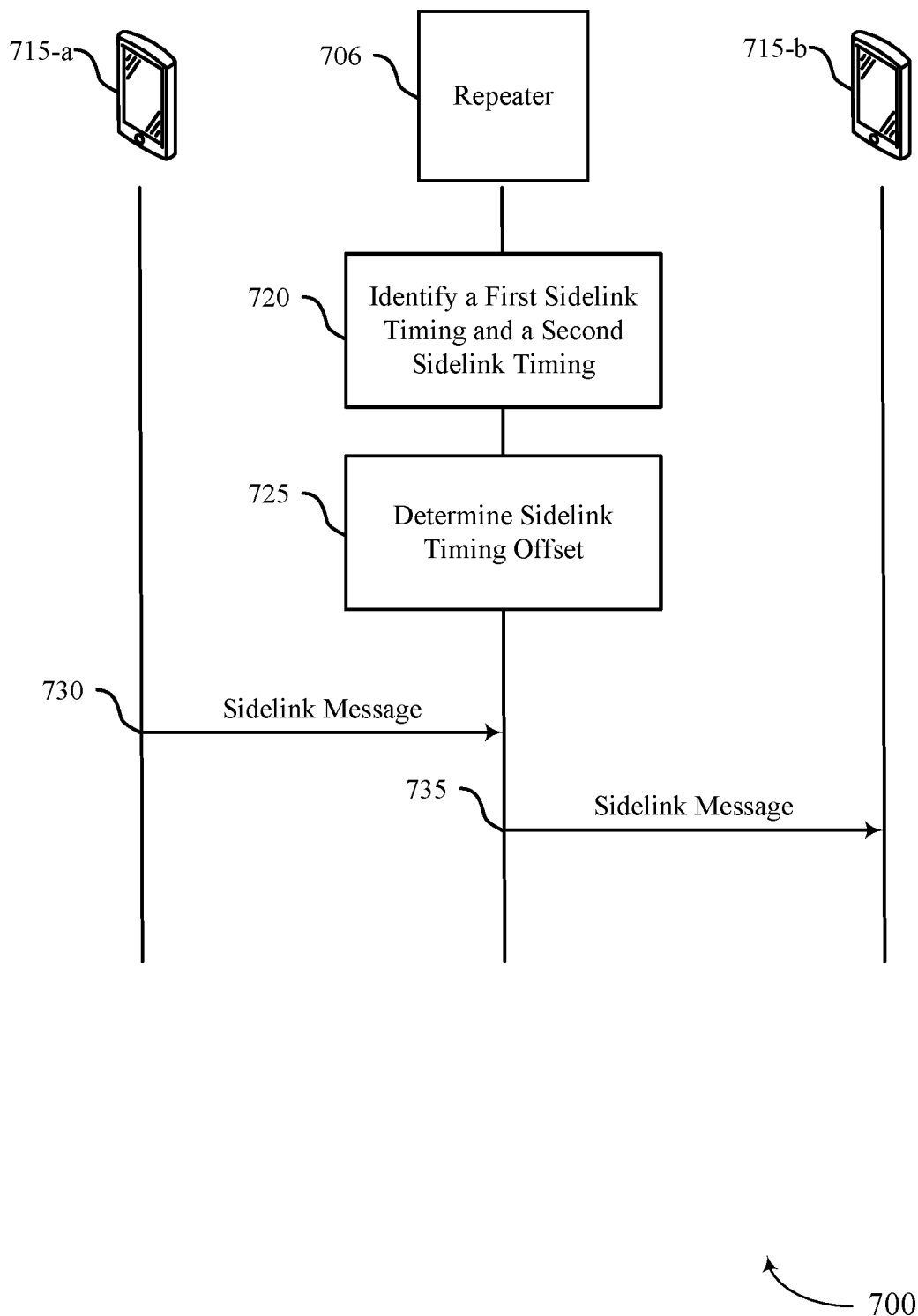
FIG. 7 illustrates an example of a process flow that supports sidelink timing advance for a repeater in accordance with one or more aspects of the present disclosure.

FIG. 7 illustrates an example of a process flow 700 that supports sidelink timing advance for a repeater in accordance with one or more aspects of the present disclosure. In some examples, the process flow 700 may implement or be implemented by one or more aspects of the wireless communications systems 100 and 300 and the network architecture 200. For example, the process flow 700 may be implemented by one or more UE 715 (a UE 715-*a* and a UE 715-*b*) and a repeater 706, which may be examples of the corresponding devices described with reference to FIGS. 1 through 3. In the following description of the process flow 700 the operations between the UE 715 and the repeater 706 may be performed in different orders or at different times. Some operations may also be omitted.

A wireless communications system may support one or more techniques for sidelink timing advance for a repeater, in which a wireless communications network may configure a device (e.g., the repeater 706) with one or more rules for determining a sidelink timing offset to use for repeating sidelink messages between other communication devices (e.g., the UEs 715). As illustrated in the example of FIG. 7, at 720, the repeater may identify a first sidelink communication timing of the UE 715-*a* and a second sidelink communication timing of the UE 715-*b*. The UE 715-*a* and the UE 715-*b* may be in communication with the repeater 706. In some examples, the first sidelink communication timing and the second sidelink communication timing may be examples of sidelink timings as described with reference to FIGS. 3, 4A, 4B, 5, and 6. For example, the first sidelink communication timing and the second sidelink communication timing may depend on an operation mode (e.g., a state)

of the UEs 715 (e.g., whether one or both of the UEs 715 are IC or OoC of a network entity serving the repeater 706).

At 725, the repeater 706 may determine a sidelink timing offset. In some examples, the sidelink timing offset may be an example of a sidelink timing offset as described with reference to FIGS. 3, 4A, 4B, 5, and 6. For example, the sidelink timing offset may be used by the repeater 706 in repeating a sidelink message between the UE 715-a and the UE 715-b. In some examples, the repeater 706 may determine the sidelink timing offset based at on the first sidelink communication timing and the second sidelink communication timing.

At 730 and at 735, the repeater 706 may repeat the sidelink message between the UE 715-a and the UE 715-b in accordance with the sidelink timing offset. For example, at 730, the repeater 706 may receive the sidelink message from the UE 715-a and, at 735, the repeater 706 may transmit the sidelink message (e.g., a same sidelink message as was received by the repeater 706 at 730 or a different sidelink message based on the sidelink message receive by the repeater 706 at 730). In some examples, by repeating the sidelink message in accordance with the sidelink timing offset, the repeater 706 may increase data rates and resource utilization with a wireless communications system, among other possible benefits.

Figure 8:
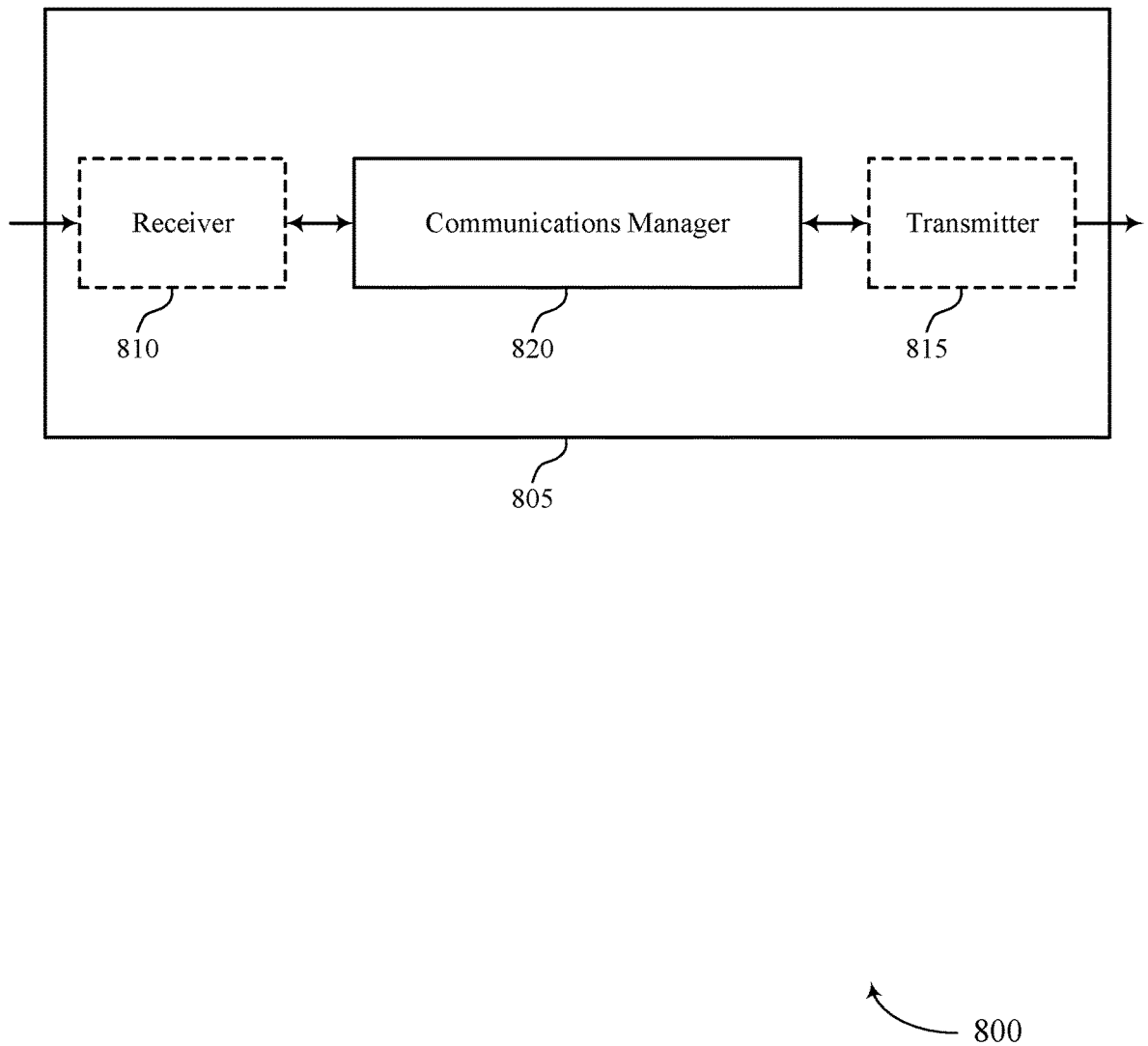
FIGS. 8 and 9 show block diagrams of devices that support sidelink timing advance for a repeater in accordance with one or more aspects of the present disclosure.

FIG. 8 shows a block diagram 800 of a device 805 that supports sidelink timing advance for a repeater in accordance with one or more aspects of the present disclosure. The device 805 may be an example of aspects of a repeater as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

In some examples, the transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of sidelink timing advance for a repeater as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, a graphics processing unit (GPU), an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in hardware, software (e.g., executed by a processor), or any combination thereof. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first device (e.g., the device 805) in accordance with examples as disclosed herein. For example, the communications manager 820 may be configured as or otherwise support a means for identifying a first sidelink communication timing of a first UE in communication with the first device and a second sidelink communication timing of a second UE in communication with the first device. The communications manager 820 may be configured as or otherwise support a means for determining, based on the first sidelink communication timing and the second sidelink communication timing, a sidelink timing offset to be used by the first device in repeating a sidelink message between the first UE and the second UE. The communications manager 820 may be configured as or otherwise support a means for repeating the sidelink message between the first UE and the second UE in accordance with the sidelink timing offset.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources.

Figure 9:
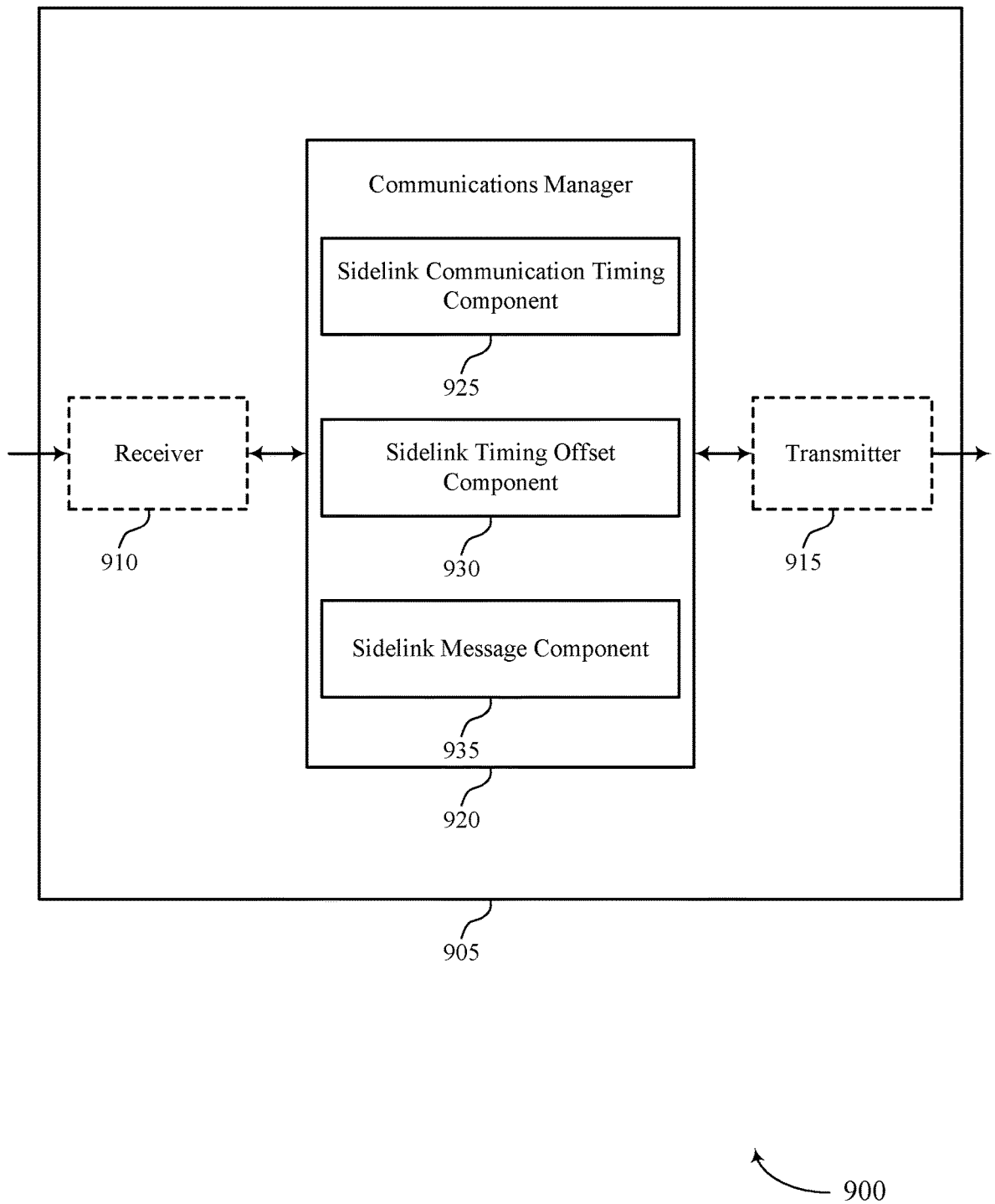

FIG. 9 shows a block diagram 900 of a device 905 that supports sidelink timing advance for a repeater in accordance with one or more aspects of the present disclosure. The device 905 may be an example of aspects of a device 805 or a repeater as described herein. The device 905 may include a receiver 910, a transmitter 915, and a communications manager 920. The device 905 may also include a processor. Each of these components may be in communication with one another (e.g., via one or more buses).

In some examples, the receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

In some examples, the transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of sidelink timing advance for a repeater as described herein. For example, the communications manager 920 may include a sidelink communication timing component 925, a sidelink timing offset component 930, a sidelink message component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first device (e.g., the device 905) in accordance with examples as disclosed herein. The sidelink communication timing component 925 may be configured as or otherwise support a means for identifying a first sidelink communication timing of a first UE in communication with the first device and a second sidelink communication timing of a second UE in communication with the first device. The sidelink timing offset component 930 may be configured as or otherwise support a means for determining, based on the first sidelink communication timing and the second sidelink communication timing, a sidelink timing offset to be used by the first device in repeating a sidelink message between the first UE and the second UE. The sidelink message component 935 may be configured as or otherwise support a means for repeating the sidelink message between the first UE and the second UE in accordance with the sidelink timing offset.

Figure 10:
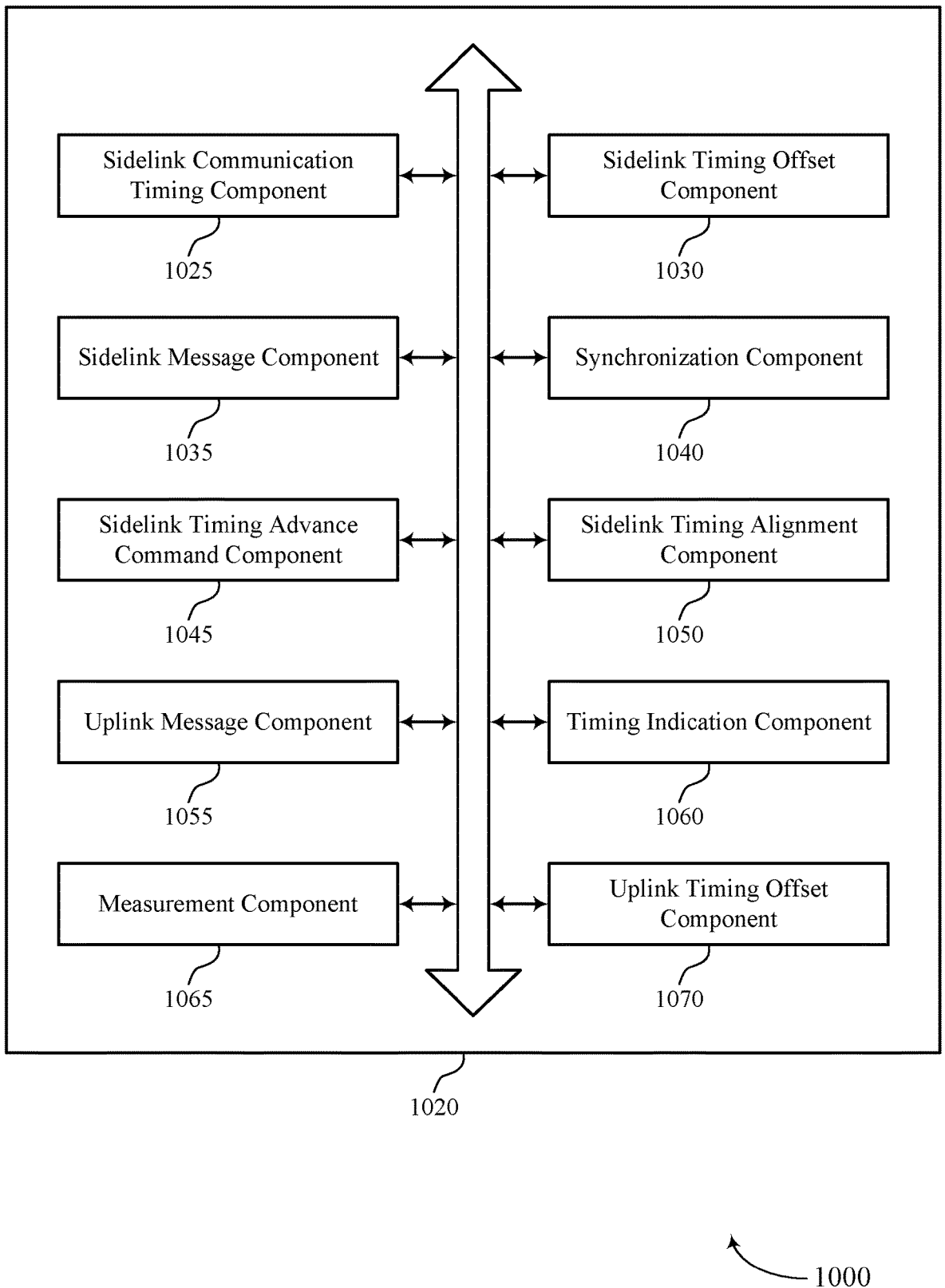
FIG. 10 shows a block diagram of a communications manager that supports sidelink timing advance for a repeater in accordance with one or more aspects of the present disclosure.

FIG. 10 shows a block diagram 1000 of a communications manager 1020 that supports sidelink timing advance for a repeater in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of sidelink timing advance for a repeater as described herein. For example, the communications manager 1020 may include a sidelink communication timing component 1025, a sidelink timing offset component 1030, a sidelink message component 1035, a synchronization component 1040, a sidelink timing advance command component 1045, a sidelink timing alignment component 1050, an uplink message component 1055, a timing indication component 1060, a measurement component 1065, an uplink timing offset component 1070, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a first device in accordance with examples as disclosed herein. The sidelink communication timing component 1025 may be configured as or otherwise support a means for identifying a first sidelink communication timing of a first UE in communication with the first device and a second sidelink communication timing of a second UE in communication with the first device. The sidelink timing offset component 1030 may be configured as or otherwise support a means for determining, based on the first sidelink communication timing and the second sidelink communication timing, a sidelink timing offset to be used by the first device in repeating a sidelink message between the first UE and the second UE. The sidelink message component 1035 may be configured as or otherwise support a means for repeating the sidelink message between the first UE and the second UE in accordance with the sidelink timing offset.

In some examples, the synchronization component 1040 may be configured as or otherwise support a means for determining that the first UE and the second UE are synchronized. In some examples, the sidelink communication timing component 1025 may be configured as or otherwise support a means for determining that the first sidelink communication timing of the first UE is a same sidelink communication timing as the second sidelink communication timing of the second UE based on the first UE and the second UE being synchronized, where determining the sidelink timing offset to be used by the first device is based on the first sidelink communication timing being the same sidelink communication timing as the second sidelink communication timing.

In some examples, the synchronization component 1040 may be configured as or otherwise support a means for receiving a message from a second device indicating that the first UE and the second UE are synchronized, where determining that the first sidelink communication timing of the first UE is the same sidelink communication timing as the second sidelink communication timing of the second UE is based on receiving the message.

In some examples, the synchronization component 1040 may be configured as or otherwise support a means for determining that the first device is synchronized to one or both of the first UE or the second UE, where determining that the first sidelink communication timing of the first UE is the same sidelink communication timing as the second sidelink communication timing of the second UE is based on determining that the first device is synchronized to one or both of the first UE or the second UE.

In some examples, the sidelink communication timing component 1025 may be configured as or otherwise support a means for receiving reference signals from the first UE and the second UE, where determining that the first sidelink communication timing of the first UE is the same sidelink communication timing as the second sidelink communication timing of the second UE is based on performing one or more measurements on the reference signals received from the first UE and the second UE. In some examples, the sidelink timing offset is based on a switching gap. In some examples, the sidelink timing offset is measured from a downlink frame for repeating downlink messages.

In some examples, the sidelink timing alignment component 1050 may be configured as or otherwise support a means for aligning the first sidelink communication timing and the second sidelink communication timing with an uplink frame for repeating uplink messages, where repeating the sidelink message between the first UE and the second UE in accordance with the sidelink timing offset is based on the alignment, and where aligning the first sidelink communication timing and the second sidelink communication timing with the uplink frame includes. In some examples, the uplink message component 1055 may be configured as or otherwise support a means for refraining from repeating the uplink messages in accordance with an uplink timing offset.

In some examples, the sidelink message component 1035 may be configured as or otherwise support a means for repeating the sidelink message in accordance with a first sidelink timing offset, where the first sidelink timing offset is based on the switching gap and the uplink timing offset, and where the first sidelink timing offset includes the sidelink timing offset. In some examples, the sidelink message component 1035 may be configured as or otherwise support a means for repeating the sidelink message and the uplink messages in accordance with a second sidelink timing offset, where the second sidelink timing off is based on an average of the switching gap and the uplink timing offset, and where the second sidelink timing offset includes the sidelink timing offset.

In some examples, the sidelink timing alignment component 1050 may be configured as or otherwise support a means for aligning the first sidelink communication timing and the second sidelink communication timing with a downlink frame for repeating downlink messages, where repeating the sidelink message between the first UE and the second UE in accordance with the sidelink timing offset is based on the alignment.

In some examples, the sidelink timing alignment component 1050 may be configured as or otherwise support a means for aligning the first sidelink communication timing and the second sidelink communication timing with an uplink frame for repeating uplink messages, where repeating the sidelink message between the first UE and the second UE in accordance with the sidelink timing offset is based on the alignment.

In some examples, the timing indication component 1060 may be configured as or otherwise support a means for transmitting, to the first UE and the second UE an indication indicating that the timing of the sidelink message is aligned with the uplink frame for repeating the uplink messages, where repeating the sidelink message between the first UE and the second UE in accordance with the sidelink timing offset is further based on transmitting the indication. In some examples, a timing of the uplink frame is based on a switching gap and an uplink timing offset. In some examples, a difference between the sidelink timing offset and the timing of the uplink frame is an integer number of symbols.

In some examples, the uplink timing offset component 1070 may be configured as or otherwise support a means for receiving a message from a second device indicating the uplink timing offset. In some examples, the sidelink timing offset component 1030 may be configured as or otherwise support a means for selecting the sidelink timing offset based on the difference between the sidelink timing offset and the timing of the uplink frame being the integer number of symbols.

In some examples, the uplink timing offset component 1070 may be configured as or otherwise support a means for selecting the uplink timing offset and the sidelink timing offset, where the sidelink timing offset is set to zero, and where selecting the uplink timing offset is based on the difference between the sidelink timing offset and the timing of the uplink frame being the integer number of symbols.

In some examples, the uplink timing offset component 1070 may be configured as or otherwise support a means for transmitting a first message to a second device indicating the uplink timing offset. In some examples, the uplink timing offset component 1070 may be configured as or otherwise support a means for receiving a second message from the second device enabling or disabling the uplink timing offset based on a value of the uplink timing offset.

In some examples, the uplink timing offset component 1070 may be configured as or otherwise support a means for selecting the uplink timing offset and the sidelink timing offset based on determining a minimum misalignment between the timing of the uplink frame and the sidelink timing offset.

In some examples, the synchronization component 1040 may be configured as or otherwise support a means for determining that the first UE and the second UE are not synchronized. In some examples, the sidelink communication timing component 1025 may be configured as or otherwise support a means for determining that the first sidelink communication timing of the first UE is different from the second sidelink communication timing of the second UE based on the first UE and the second UE not being synchronized, where determining the sidelink timing offset to be used by the first device is based on the first sidelink communication timing being different from the second sidelink communication timing.

In some examples, the sidelink timing alignment component 1050 may be configured as or otherwise support a means for aligning the first sidelink communication timing of the first UE with a reception timing. In some examples, the sidelink timing alignment component 1050 may be configured as or otherwise support a means for aligning the second sidelink communication timing of the second UE with a transmission timing, where determining the sidelink timing offset is further based on the reception timing and the transmission timing.

In some examples, the sidelink timing offset component 1030 may be configured as or otherwise support a means for identifying a first difference between a timing of an uplink frame for transmitting uplink messages and the reception timing and a second difference between the timing of the uplink frame and the transmission timing, where determining the sidelink timing offset is based on the first difference and the second difference.

In some examples, the sidelink timing alignment component 1050 may be configured as or otherwise support a means for determining the sidelink timing offset based on. In some examples, the measurement component 1065 may be configured as or otherwise support a means for performing one or more measurements on signals received from the first UE and the second UE. In some examples, the sidelink timing offset component 1030 may be configured as or otherwise support a means for receiving an indication of the sidelink timing offset from a second device.

In some examples, the synchronization component 1040 may be configured as or otherwise support a means for synchronizing the first UE and the second UE to the first device based on determining that the first UE and the second UE are not synchronized. In some examples, the synchronization component 1040 may be configured as or otherwise support a means for transmitting a message to the first UE and the second UE indicating for the first UE and the second UE to synchronize to the first device. In some examples, the synchronization component 1040 may be configured as or otherwise support a means for transmitting sidelink synchronization signals to the first UE and the second UE, where synchronizing the first UE and the second UE to the first device is based on the sidelink synchronization signals.

In some examples, the sidelink timing advance command component 1045 may be configured as or otherwise support a means for receiving a message from a second device indicating a sidelink timing advance command associated with repeating sidelink messages between the first UE and the second UE, where determining the sidelink timing offset to be used by the first device in repeating the sidelink message between the first UE and the second UE is further based on the sidelink timing advance command.

Figure 11:
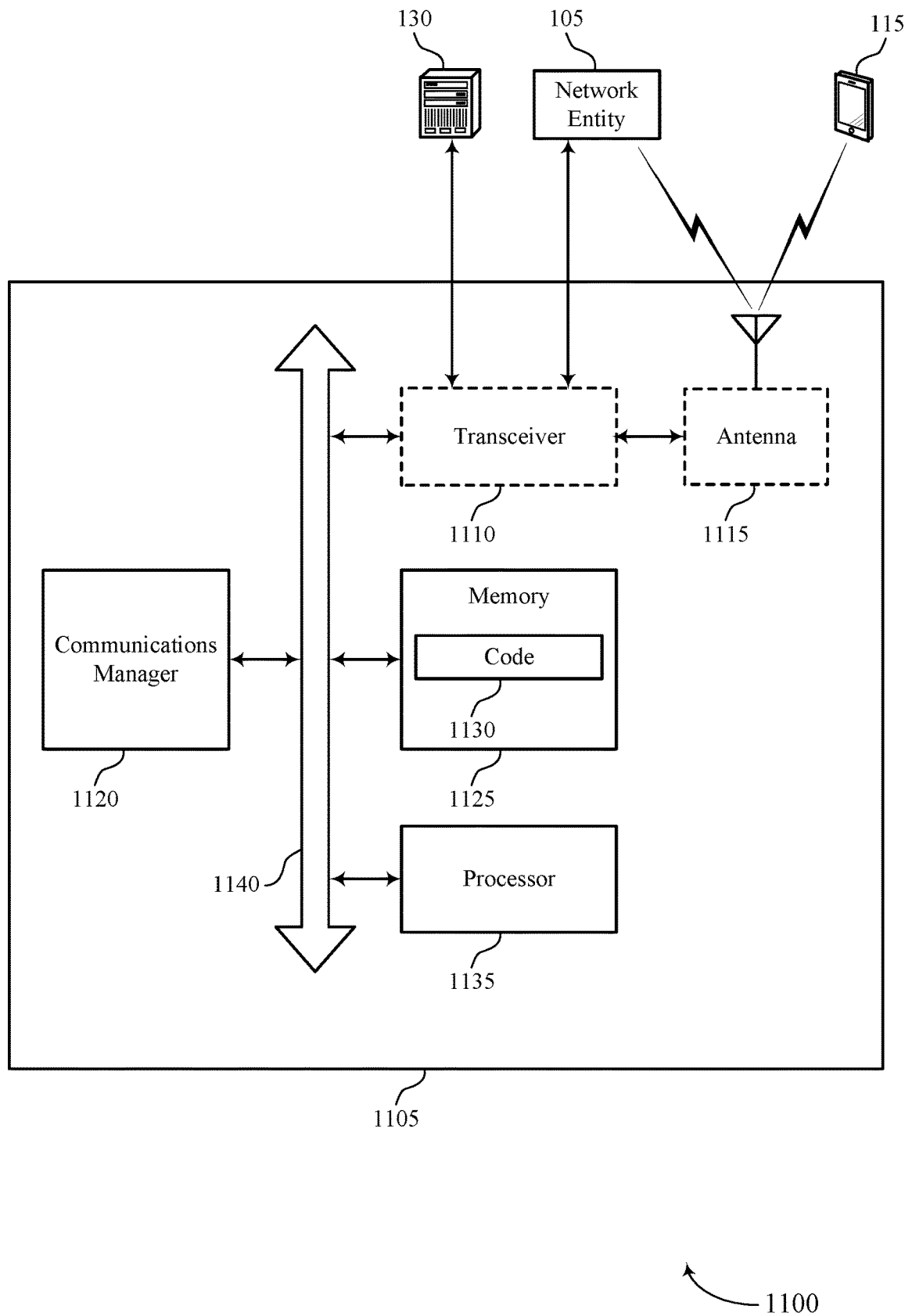
FIG. 11 shows a diagram of a system including a device that supports sidelink timing advance for a repeater in accordance with one or more aspects of the present disclosure.

FIG. 11 shows a diagram of a system 1100 including a device 1105 that supports sidelink timing advance for a repeater in accordance with one or more aspects of the present disclosure. The device 1105 may be an example of or include the components of a device 805, a device 905, or a repeater as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

In some examples, the transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting sidelink timing advance for a repeater). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a first device (e.g., the device 1105) in accordance with examples as disclosed herein. For example, the communications manager 1120 may be configured as or otherwise support a means for identifying a first sidelink communication timing of a first UE in communication with the first device and a second sidelink communication timing of a second UE in communication with the first device. The communications manager 1120 may be configured as or otherwise support a means for determining, based on the first sidelink communication timing and the second sidelink communication timing, a sidelink timing offset to be used by the first device in repeating a sidelink message between the first UE and the second UE. The communications manager 1120 may be configured as or otherwise support a means for repeating the sidelink message between the first UE and the second UE in accordance with the sidelink timing offset.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of sidelink timing advance for a repeater as described herein, or the processor 1135 and the memory 1125 may be otherwise configured to perform or support such operations.

Figure 12:
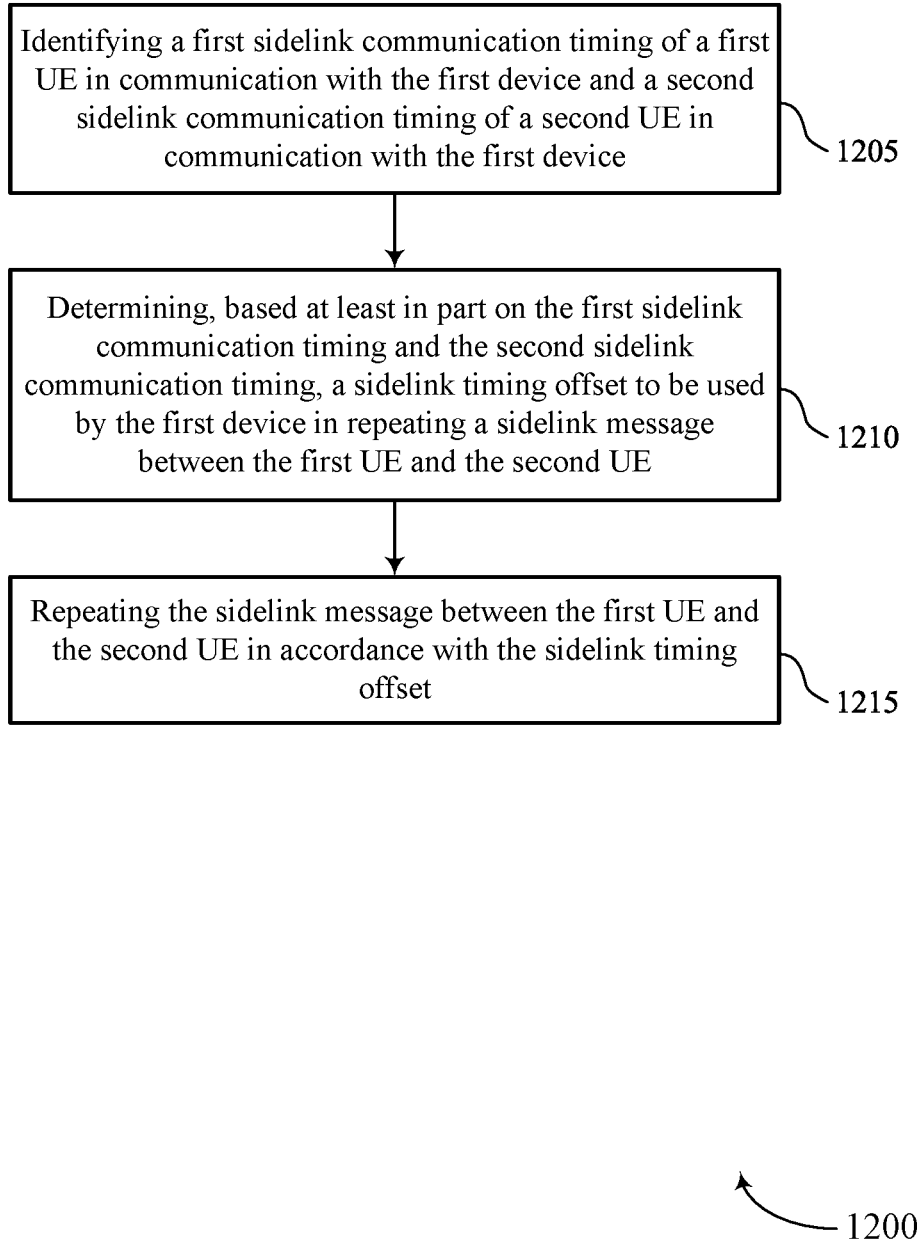
FIGS. 12 through 16 show flowcharts illustrating methods that support sidelink timing advance for a repeater in accordance with one or more aspects of the present disclosure.

FIG. 12 shows a flowchart illustrating a method 1200 that supports sidelink timing advance for a repeater in accordance with one or more aspects of the present disclosure.

The operations of the method 1200 may be implemented by a repeater or its components as described herein. For example, the operations of the method 1200 may be performed by a repeater as described with reference to FIGS. 1 through 11. In some examples, a repeater may execute a set of instructions to control the functional elements of the repeater to perform the described functions. Additionally, or alternatively, the repeater may perform aspects of the described functions using special-purpose hardware.

At 1205, the method may include identifying a first sidelink communication timing of a first UE in communication with the first device and a second sidelink communication timing of a second UE in communication with the first device. The operations of 1205 may be performed in accordance with examples as disclosed herein. In some examples, aspects of the operations of 1205 may be performed by a sidelink communication timing component 1025 as described with reference to FIG. 10.

At 1210, the method may include determining, based at least in part on the first sidelink communication timing and the second sidelink communication timing, a sidelink timing offset to be used by the first device in repeating a sidelink message between the first UE and the second UE. The operations of 1210 may be performed in accordance with examples as disclosed herein. In some examples, aspects of the operations of 1210 may be performed by a sidelink timing offset component 1030 as described with reference to FIG. 10.

At 1215, the method may include repeating the sidelink message between the first UE and the second UE in accordance with the sidelink timing offset. The operations of 1215 may be performed in accordance with examples as disclosed herein. In some examples, aspects of the operations of 1215 may be performed by a sidelink message component 1035 as described with reference to FIG. 10.

Figure 13:
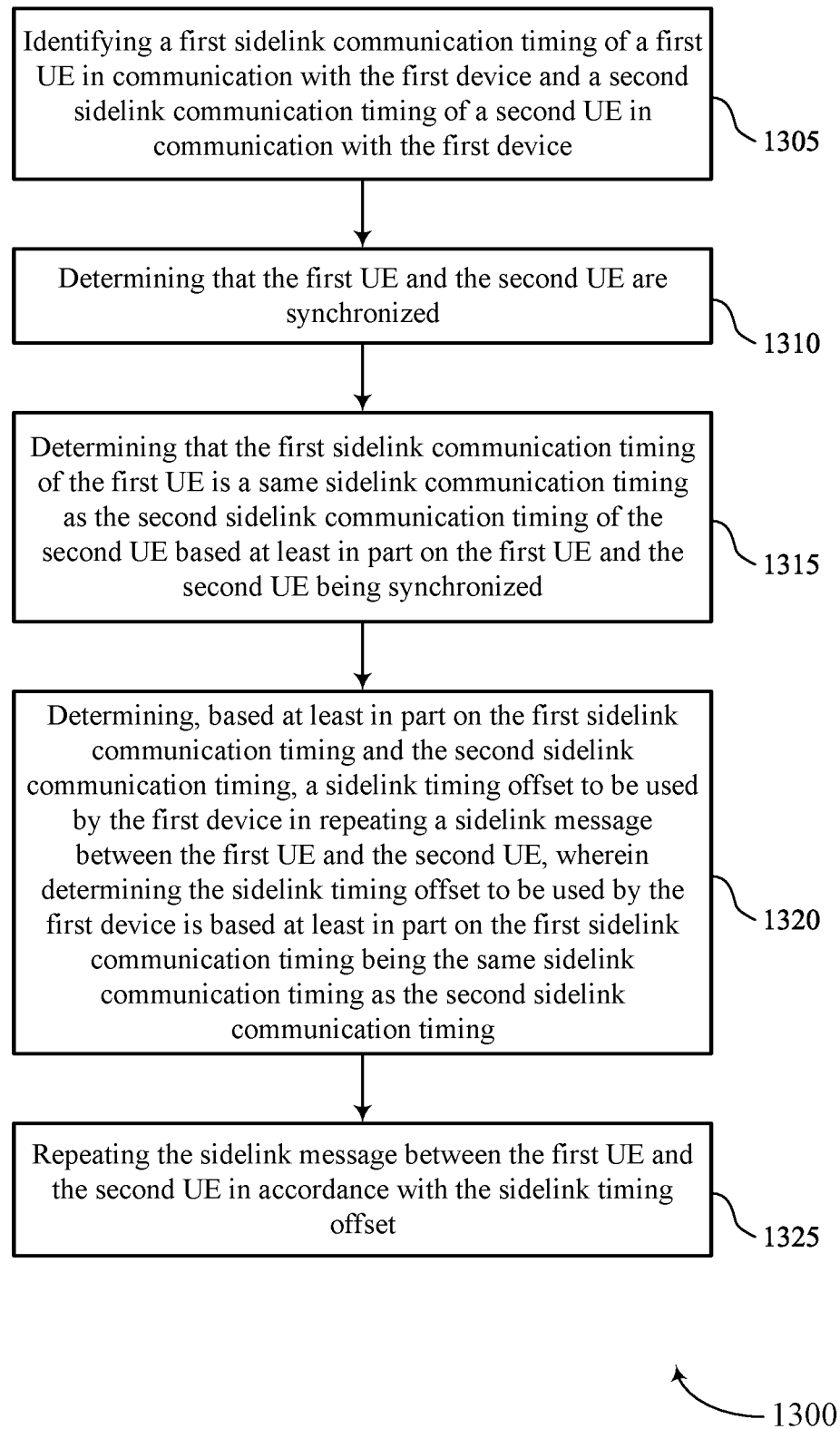

FIG. 13 shows a flowchart illustrating a method 1300 that supports sidelink timing advance for a first device (e.g., a repeater) in accordance with one or more aspects of the present disclosure. The operations of the method 1300 may be implemented by a repeater or its components as described herein. For example, the operations of the method 1300 may be performed by a repeater as described with reference to FIGS. 1 through 11. In some examples, a repeater may execute a set of instructions to control the functional elements of the repeater to perform the described functions. Additionally, or alternatively, the repeater may perform aspects of the described functions using special-purpose hardware.

At 1305, the method may include identifying a first sidelink communication timing of a first UE in communication with the first device (e.g., a repeater) and a second sidelink communication timing of a second UE in communication with the first device. The operations of 1305 may be performed in accordance with examples as disclosed herein. In some examples, aspects of the operations of 1305 may be performed by a sidelink communication timing component 1025 as described with reference to FIG. 10.

At 1310, the method may include determining that the first UE and the second UE are synchronized. The operations of 1310 may be performed in accordance with examples as disclosed herein. In some examples, aspects of the operations of 1310 may be performed by a synchronization component 1040 as described with reference to FIG. 10.

At 1315, the method may include determining that the first sidelink communication timing of the first UE is a same sidelink communication timing as the second sidelink communication timing of the second UE based at least in part on the first UE and the second UE being synchronized. The operations of 1315 may be performed in accordance with examples as disclosed herein. In some examples, aspects of the operations of 1315 may be performed by a sidelink communication timing component 1025 as described with reference to FIG. 10.

At 1320, the method may include determining, based at least in part on the first sidelink communication timing and the second sidelink communication timing, a sidelink timing offset to be used by the first device in repeating a sidelink message between the first UE and the second UE, wherein determining the sidelink timing offset to be used by the first device is based at least in part on the first sidelink communication timing being the same sidelink communication timing as the second sidelink communication timing. The operations of 1320 may be performed in accordance with examples as disclosed herein. In some examples, aspects of the operations of 1320 may be performed by a sidelink timing offset component 1030 as described with reference to FIG. 10.

At 1325, the method may include repeating the sidelink message between the first UE and the second UE in accordance with the sidelink timing offset. The operations of 1325 may be performed in accordance with examples as disclosed herein. In some examples, aspects of the operations of 1325 may be performed by a sidelink message component 1035 as described with reference to FIG. 10.

Figure 14:
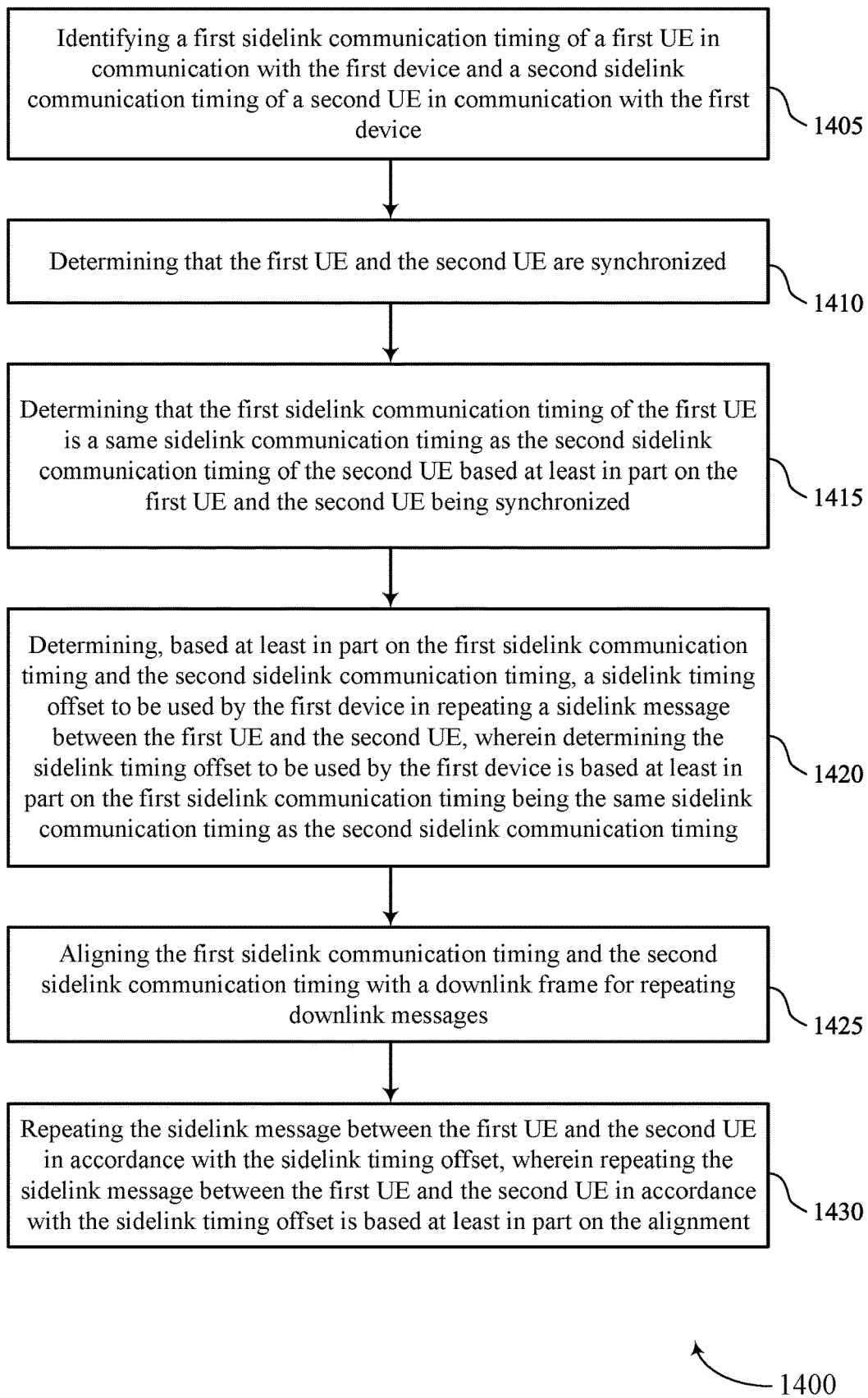

FIG. 14 shows a flowchart illustrating a method 1400 that supports sidelink timing advance for a first device (e.g., a repeater) in accordance with one or more aspects of the present disclosure. The operations of the method 1400 may be implemented by a repeater or its components as described herein. For example, the operations of the method 1400 may be performed by a repeater as described with reference to FIGS. 1 through 11. In some examples, a repeater may execute a set of instructions to control the functional elements of the repeater to perform the described functions. Additionally, or alternatively, the repeater may perform aspects of the described functions using special-purpose hardware.

At 1405, the method may include identifying a first sidelink communication timing of a first UE in communication with the first device (e.g., a repeater) and a second sidelink communication timing of a second UE in communication with the first device. The operations of 1405 may be performed in accordance with examples as disclosed herein. In some examples, aspects of the operations of 1405 may be performed by a sidelink communication timing component 1025 as described with reference to FIG. 10.

At 1410, the method may include determining that the first UE and the second UE are synchronized. The operations of 1410 may be performed in accordance with examples as disclosed herein. In some examples, aspects of the operations of 1410 may be performed by a synchronization component 1040 as described with reference to FIG. 10.

At 1415, the method may include determining that the first sidelink communication timing of the first UE is a same sidelink communication timing as the second sidelink communication timing of the second UE based at least in part on the first UE and the second UE being synchronized. The operations of 1415 may be performed in accordance with examples as disclosed herein. In some examples, aspects of the operations of 1415 may be performed by a sidelink communication timing component 1025 as described with reference to FIG. 10.

At 1420, the method may include determining, based at least in part on the first sidelink communication timing and the second sidelink communication timing, a sidelink timing offset to be used by the first device in repeating a sidelink message between the first UE and the second UE, wherein determining the sidelink timing offset to be used by the first device is based at least in part on the first sidelink communication timing being the same sidelink communication timing as the second sidelink communication timing. The operations of 1420 may be performed in accordance with examples as disclosed herein. In some examples, aspects of the operations of 1420 may be performed by a sidelink timing offset component 1030 as described with reference to FIG. 10.

At 1425, the method may include aligning the first sidelink communication timing and the second sidelink communication timing with a downlink frame for repeating downlink messages. The operations of 1425 may be performed in accordance with examples as disclosed herein. In some examples, aspects of the operations of 1425 may be performed by a sidelink timing alignment component 1050 as described with reference to FIG. 10.

At 1430, the method may include repeating the sidelink message between the first UE and the second UE in accordance with the sidelink timing offset, wherein repeating the sidelink message between the first UE and the second UE in accordance with the sidelink timing offset is based at least in part on the alignment. The operations of 1430 may be performed in accordance with examples as disclosed herein. In some examples, aspects of the operations of 1430 may be performed by a sidelink message component 1035 as described with reference to FIG. 10.

Figure 15:
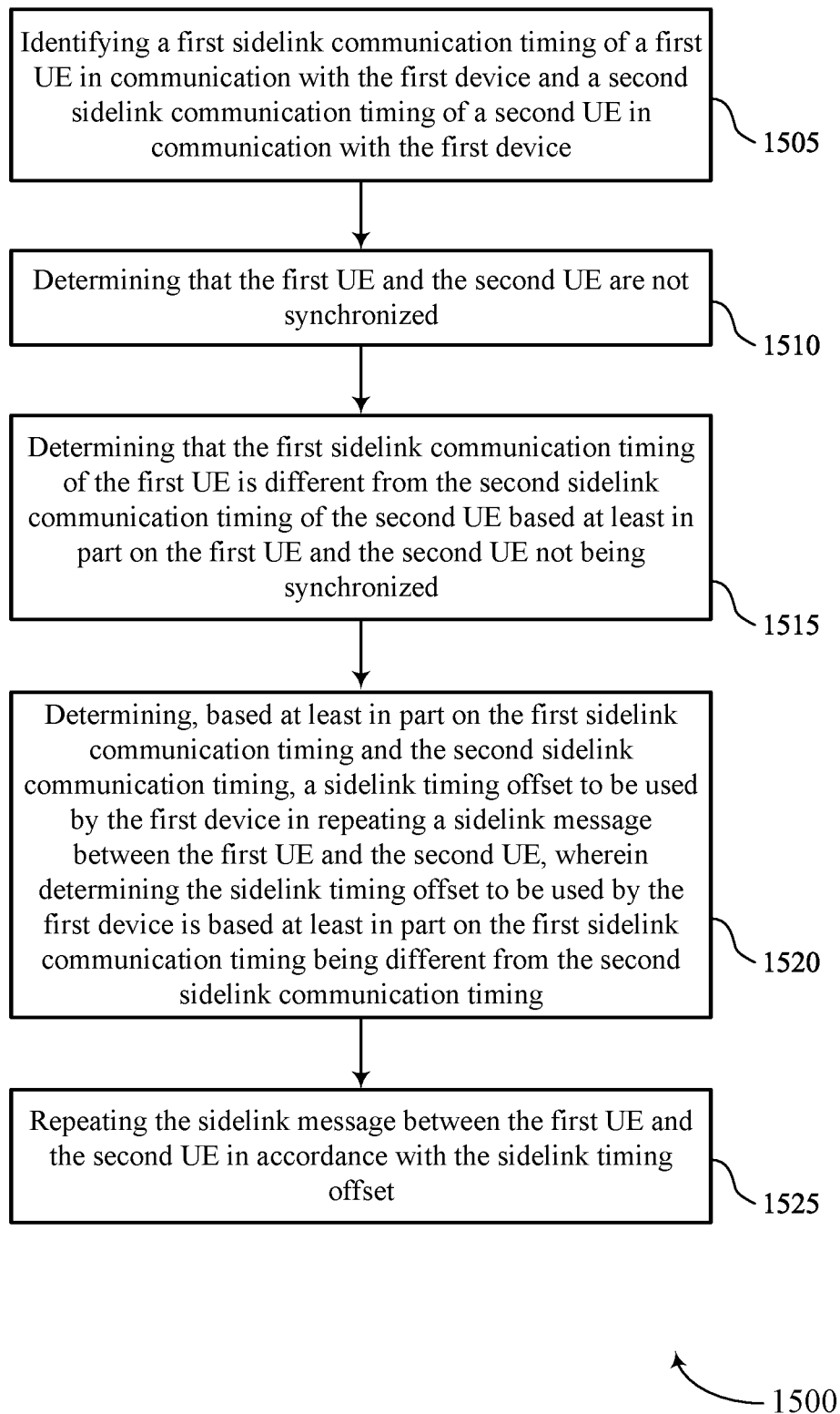

FIG. 15 shows a flowchart illustrating a method 1500 that supports sidelink timing advance for a first device (e.g., a repeater) in accordance with one or more aspects of the present disclosure. The operations of the method 1500 may be implemented by a repeater or its components as described herein. For example, the operations of the method 1500 may be performed by a repeater as described with reference to FIGS. 1 through 11. In some examples, a repeater may execute a set of instructions to control the functional elements of the repeater to perform the described functions. Additionally, or alternatively, the repeater may perform aspects of the described functions using special-purpose hardware.

At 1505, the method may include identifying a first sidelink communication timing of a first UE in communication with the first device (e.g., a repeater) and a second sidelink communication timing of a second UE in communication with the first device. The operations of 1505 may be performed in accordance with examples as disclosed herein. In some examples, aspects of the operations of 1505 may be performed by a sidelink communication timing component 1025 as described with reference to FIG. 10.

At 1510, the method may include determining that the first UE and the second UE are not synchronized. The operations of 1510 may be performed in accordance with examples as disclosed herein. In some examples, aspects of the operations of 1510 may be performed by a synchronization component 1040 as described with reference to FIG. 10.

At 1515, the method may include determining that the first sidelink communication timing of the first UE is different from the second sidelink communication timing of the second UE based at least in part on the first UE and the second UE not being synchronized. The operations of 1515 may be performed in accordance with examples as disclosed herein. In some examples, aspects of the operations of 1515 may be performed by a sidelink communication timing component 1025 as described with reference to FIG. 10.

At 1520, the method may include determining, based at least in part on the first sidelink communication timing and the second sidelink communication timing, a sidelink timing offset to be used by the first device in repeating a sidelink message between the first UE and the second UE, wherein determining the sidelink timing offset to be used by the first device is based at least in part on the first sidelink communication timing being different from the second sidelink communication timing. The operations of 1520 may be performed in accordance with examples as disclosed herein. In some examples, aspects of the operations of 1520 may be performed by a sidelink timing offset component 1030 as described with reference to FIG. 10.

At 1525, the method may include repeating the sidelink message between the first UE and the second UE in accordance with the sidelink timing offset. The operations of 1525 may be performed in accordance with examples as disclosed herein. In some examples, aspects of the operations of 1525 may be performed by a sidelink message component 1035 as described with reference to FIG. 10.

Figure 16:
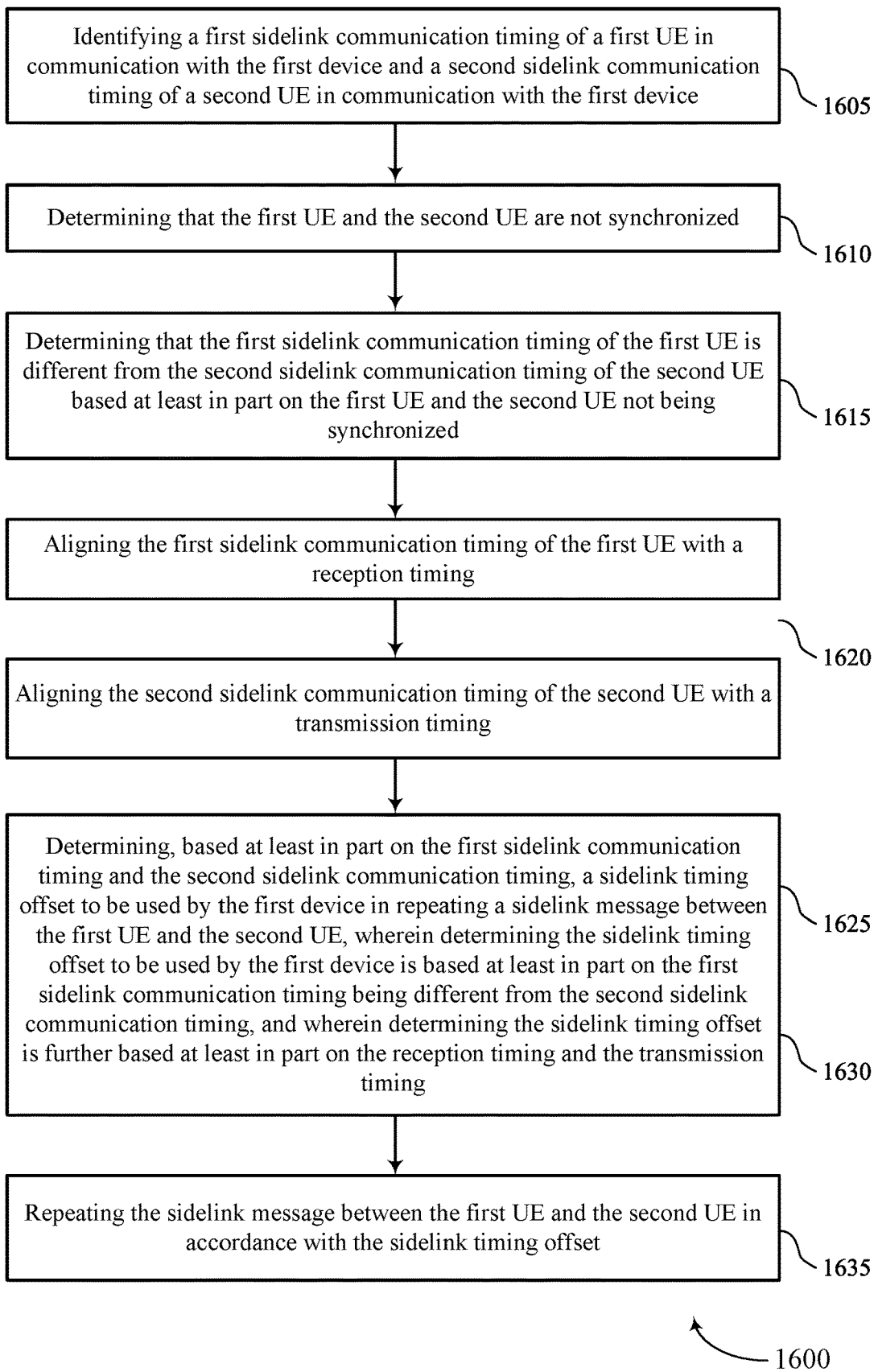

FIG. 16 shows a flowchart illustrating a method 1600 that supports sidelink timing advance for a first device (e.g., a repeater) in accordance with one or more aspects of the present disclosure. The operations of the method 1600 may be implemented by a repeater or its components as described herein. For example, the operations of the method 1600 may be performed by a repeater as described with reference to FIGS. 1 through 11. In some examples, a repeater may execute a set of instructions to control the functional elements of the repeater to perform the described functions. Additionally, or alternatively, the repeater may perform aspects of the described functions using special-purpose hardware.

At 1605, the method may include identifying a first sidelink communication timing of a first UE in communication with the first device (e.g., a repeater) and a second sidelink communication timing of a second UE in communication with the first device. The operations of 1605 may be performed in accordance with examples as disclosed herein. In some examples, aspects of the operations of 1605 may be performed by a sidelink communication timing component 1025 as described with reference to FIG. 10.

At 1610, the method may include determining that the first UE and the second UE are not synchronized. The operations of 1610 may be performed in accordance with examples as disclosed herein. In some examples, aspects of the operations of 1610 may be performed by a synchronization component 1040 as described with reference to FIG. 10.

At 1615, the method may include determining that the first sidelink communication timing of the first UE is different from the second sidelink communication timing of the second UE based at least in part on the first UE and the second UE not being synchronized. The operations of 1615 may be performed in accordance with examples as disclosed herein. In some examples, aspects of the operations of 1615 may be performed by a sidelink communication timing component 1025 as described with reference to FIG. 10.

At 1620, the method may include aligning the first sidelink communication timing of the first UE with a reception timing. The operations of 1620 may be performed in accordance with examples as disclosed herein. In some examples, aspects of the operations of 1620 may be performed by a sidelink timing alignment component 1050 as described with reference to FIG. 10.

At 1625, the method may include aligning the second sidelink communication timing of the second UE with a transmission timing. The operations of 1625 may be performed in accordance with examples as disclosed herein. In some examples, aspects of the operations of 1625 may be performed by a sidelink timing alignment component 1050 as described with reference to FIG. 10.

At 1630, the method may include determining, based at least in part on the first sidelink communication timing and the second sidelink communication timing, a sidelink timing offset to be used by the first device in repeating a sidelink message between the first UE and the second UE, wherein determining the sidelink timing offset to be used by the first device is based at least in part on the first sidelink communication timing being different from the second sidelink communication timing, and wherein determining the sidelink timing offset is further based at least in part on the reception timing and the transmission timing. The operations of 1630 may be performed in accordance with examples as disclosed herein. In some examples, aspects of the operations of 1630 may be performed by a sidelink timing offset component 1030 as described with reference to FIG. 10.

At 1635, the method may include repeating the sidelink message between the first UE and the second UE in accordance with the sidelink timing offset. The operations of 1635 may be performed in accordance with examples as disclosed herein. In some examples, aspects of the operations of 1635 may be performed by a sidelink message component 1035 as described with reference to FIG. 10.

The following provides an overview of aspects of the present disclosure:

Aspect 1: A method for wireless communication at a first device, comprising: identifying a first sidelink communication timing of a first UE in communication with the first device and a second sidelink communication timing of a second UE in communication with the first device; determining, based at least in part on the first sidelink communication timing and the second sidelink communication timing, a sidelink timing offset to be used by the first device in repeating a sidelink message between the first UE and the second UE; and repeating the sidelink message between the first UE and the second UE in accordance with the sidelink timing offset.

Aspect 2: The method of aspect 1, further comprising: determining that the first UE and the second UE are synchronized; and determining that the first sidelink communication timing of the first UE is a same sidelink communication timing as the second sidelink communication timing of the second UE based at least in part on the first UE and the second UE being synchronized, wherein determining the sidelink timing offset to be used by the first device is based at least in part on the first sidelink communication timing being the same sidelink communication timing as the second sidelink communication timing.

Aspect 3: The method of aspect 2, further comprising: receiving a message from a second device indicating that the first UE and the second UE are synchronized, wherein determining that the first sidelink communication timing of the first UE is the same sidelink communication timing of the second UE is based at least in part on receiving the message.

Aspect 4: The method of aspect 2, further comprising: determining that the first device is synchronized to one or both of the first UE or the second UE, wherein determining that the first sidelink communication timing of the first UE is the same sidelink communication timing as the second sidelink communication timing of the second UE is based at least in part on determining that the first device is synchronized to one or both of the first UE or the second UE.

Aspect 5: The method of aspect 2, further comprising: receiving reference signals from the first UE and the second UE, wherein determining that the first sidelink communication timing of the first UE is the same sidelink communication timing as the second sidelink communication timing of the second UE is based at least in part on performing one or more measurements on the reference signals received from the first UE and the second UE.

Aspect 6: The method of any of aspects 2 through 5, wherein the sidelink timing offset is based at least in part on a switching gap, and the sidelink timing offset is measured from a downlink frame for repeating downlink messages.

Aspect 7: The method of aspect 6, further comprising: aligning the first sidelink communication timing and the second sidelink communication timing with an uplink frame for repeating uplink messages, wherein repeating the sidelink message between the first UE and the second UE in accordance with the sidelink timing offset is based at least in part on the alignment, and wherein aligning the first sidelink communication timing and the second sidelink communication timing with the uplink frame comprises: refraining from repeating the uplink messages in accordance with an uplink timing offset; repeating the sidelink message in accordance with a first sidelink timing offset, wherein the first sidelink timing offset is based at least in part on the switching gap and the uplink timing offset, and wherein the first sidelink timing offset comprises the sidelink timing offset; or repeating the sidelink message and the uplink messages in accordance with a second sidelink timing offset, wherein the second sidelink timing off is based at least in part on an average of the switching gap and the uplink timing offset, and wherein the second sidelink timing offset comprises the sidelink timing offset.

Aspect 8: The method of any of aspects 2 through 7, further comprising: aligning the first sidelink communication timing and the second sidelink communication timing with a downlink frame for repeating downlink messages, wherein repeating the sidelink message between the first UE and the second UE in accordance with the sidelink timing offset is based at least in part on the alignment.

Aspect 9: The method of any of aspects 2 through 7, further comprising: aligning the first sidelink communication timing and the second sidelink communication timing with an uplink frame for repeating uplink messages, wherein repeating the sidelink message between the first UE and the second UE in accordance with the sidelink timing offset is based at least in part on the alignment.

Aspect 10: The method of aspect 9, further comprising: transmitting, to the first UE and the second UE an indication indicating that the timing of the sidelink message is aligned with the uplink frame for repeating the uplink messages, wherein repeating the sidelink message between the first UE and the second UE in accordance with the sidelink timing offset is further based at least in part on transmitting the indication.

Aspect 11: The method of any of aspects 9 through 10, wherein a timing of the uplink frame is based at least in part on a switching gap and an uplink timing offset, and a difference between the sidelink timing offset and the timing of the uplink frame is an integer number of symbols.

Aspect 12: The method of aspect 11, further comprising: receiving a message from a second device indicating the uplink timing offset; and selecting the sidelink timing offset based at least in part on the difference between the sidelink timing offset and the timing of the uplink frame being the integer number of symbols.

Aspect 13: The method of aspect 11, further comprising: selecting the uplink timing offset and the sidelink timing offset, wherein the sidelink timing offset is set to zero, and wherein selecting the uplink timing offset is based at least in part on the difference between the sidelink timing offset and the timing of the uplink frame being the integer number of symbols.

Aspect 14: The method of aspect 13, further comprising: transmitting a first message to a second device indicating the uplink timing offset; and receiving a second message from the second device enabling or disabling the uplink timing offset based at least in part on a value of the uplink timing offset.

Aspect 15: The method of aspect 11, further comprising: selecting the uplink timing offset and the sidelink timing offset based at least in part on determining a minimum misalignment between the timing of the uplink frame and the sidelink timing offset.

Aspect 16: The method of aspect 1, further comprising: determining that the first UE and the second UE are not synchronized; and determining that the first sidelink communication timing of the first UE is different from the second sidelink communication timing of the second UE based at least in part on the first UE and the second UE not being synchronized, wherein determining the sidelink timing offset to be used by the first device is based at least in part on the first sidelink communication timing being different from the second sidelink communication timing.

Aspect 17: The method of aspect 16, further comprising: aligning the first sidelink communication timing of the first UE with a reception timing; and aligning the second sidelink communication timing of the second UE with a transmission timing, wherein determining the sidelink timing offset is further based at least in part on the reception timing and the transmission timing.

Aspect 18: The method of aspect 17, further comprising: identifying a first difference between a timing of an uplink frame for transmitting uplink messages and the reception timing and a second difference between the timing of the uplink frame and the transmission timing, wherein determining the sidelink timing offset is based at least in part on the first difference and the second difference.

Aspect 19: The method of aspect 17, further comprising: determining the sidelink timing offset based at least in part on: performing one or more measurements on signals received from the first UE and the second UE; or receiving an indication of the sidelink timing offset from a second device.

Aspect 20: The method of any of aspects 16 through 19, further comprising: synchronizing the first UE and the second UE to the first device based at least in part on determining that the first UE and the second UE are not synchronized.

Aspect 21: The method of aspect 20, further comprising: transmitting a message to the first UE and the second UE indicating for the first UE and the second UE to synchronize to the first device; and transmitting sidelink synchronization signals to the first UE and the second UE, wherein synchronizing the first UE and the second UE to the first device is based at least in part on the sidelink synchronization signals.

Aspect 22: The method of aspect 1, further comprising: receiving a message from a second device indicating a sidelink timing advance command associated with repeating sidelink messages between the first UE and the second UE, wherein determining the sidelink timing offset to be used by the first device in repeating the sidelink message between the first UE and the second UE is further based at least in part on the sidelink timing advance command.

Aspect 23: An apparatus for wireless communication at a first device, comprising at least one processor; memory coupled to the at least one processor; the memory storing instructions executable by the at least one processor to cause the first device to perform a method of any of aspects 1 through 22.

Aspect 24: An apparatus for wireless communication at a first device, comprising at least one means for performing a method of any of aspects 1 through 22.

Aspect 25: A non-transitory computer-readable medium storing code for wireless communication at a first device, the code comprising instructions executable by a processor to perform a method of any of aspects 1 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), phase change memory, flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), and ascertaining. Also, "determining" can include receiving (such as receiving information), and accessing (such as accessing data in a memory). Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   performing, by the first device, one or more measurements on reference signals received from a first user equipment (UE) and a second UE;
   identifying, by the first device and based at least in part on the one or more measurements, a first sidelink communication timing of the first UE in communication with the first device and a second sidelink communication timing of the second UE in communication with the first device;
   determining, by the first device and based at least in part on the first sidelink communication timing and the second sidelink communication timing, a sidelink timing offset to be used by the first device in repeating a sidelink message between the first UE and the second UE; and
   repeating, by the first device, the sidelink message between the first UE and the second UE in accordance with the sidelink timing offset.

2. The method of claim 1, further comprising:
   determining that the first UE and the second UE are synchronized; and
   determining that the first sidelink communication timing of the first UE is a same sidelink communication timing as the second sidelink communication timing of the second UE based at least in part on the first UE and the second UE being synchronized, wherein determining the sidelink timing offset to be used by the first device is based at least in part on the first sidelink communication timing being the same sidelink communication timing as the second sidelink communication timing.

3. The method of claim 2, further comprising:
   receiving a message from a second device indicating that the first UE and the second UE are synchronized, wherein determining that the first sidelink communication timing of the first UE is the same sidelink communication timing as the second sidelink communication timing of the second UE is based at least in part on receiving the message.

4. The method of claim 2, further comprising:
   determining that the first device is synchronized to one or both of the first UE or the second UE, wherein determining that the first sidelink communication timing of the first UE is the same sidelink communication timing as the second sidelink communication timing of the second UE is based at least in part on determining that the first device is synchronized to one or both of the first UE or the second UE.

5. The method of claim 2,
   wherein determining that the first sidelink communication timing of the first UE is the same sidelink communication timing as the second sidelink communication timing of the second UE is based at least in part on the one or more measurements.

6. The method of claim 2, wherein:
   the sidelink timing offset is based at least in part on a switching gap, and
   the sidelink timing offset is measured from a downlink frame for repeating downlink messages.

7. The method of claim 6, further comprising:
   aligning the first sidelink communication timing and the second sidelink communication timing with an uplink frame for repeating uplink messages, wherein repeating the sidelink message between the first UE and the second UE in accordance with the sidelink timing offset is based at least in part on the alignment, and wherein aligning the first sidelink communication timing and the second sidelink communication timing with the uplink frame comprises:
   refraining from repeating the uplink messages in accordance with an uplink timing offset;
   repeating the sidelink message in accordance with a first sidelink timing offset, wherein the first sidelink timing offset is based at least in part on the switching gap and the uplink timing offset, and wherein the first sidelink timing offset comprises the sidelink timing offset; or
   repeating the sidelink message and the uplink messages in accordance with a second sidelink timing offset, wherein the second sidelink timing offset is based at least in part on an average of the switching gap and the uplink timing offset, and wherein the second sidelink timing offset comprises the sidelink timing offset.

8. The method of claim 2, further comprising:
aligning the first sidelink communication timing and the second sidelink communication timing with a downlink frame for repeating downlink messages, wherein repeating the sidelink message between the first UE and the second UE in accordance with the sidelink timing offset is based at least in part on the alignment.

9. The method of claim 2, further comprising:
aligning the first sidelink communication timing and the second sidelink communication timing with an uplink frame for repeating uplink messages, wherein repeating the sidelink message between the first UE and the second UE in accordance with the sidelink timing offset is based at least in part on the alignment.

10. The method of claim 9, further comprising:
transmitting, to the first UE and the second UE an indication indicating that the timing of the sidelink message is aligned with the uplink frame for repeating the uplink messages, wherein repeating the sidelink message between the first UE and the second UE in accordance with the sidelink timing offset is further based at least in part on transmitting the indication.

11. The method of claim 9, wherein:
a timing of the uplink frame is based at least in part on a switching gap and an uplink timing offset, and
a difference between the sidelink timing offset and the timing of the uplink frame is an integer number of symbols.

12. The method of claim 11, further comprising:
receiving a message from a second device indicating the uplink timing offset; and
selecting the sidelink timing offset based at least in part on the difference between the sidelink timing offset and the timing of the uplink frame being the integer number of symbols.

13. The method of claim 11, further comprising:
selecting the uplink timing offset and the sidelink timing offset, wherein the sidelink timing offset is set to zero, and wherein selecting the uplink timing offset is based at least in part on the difference between the sidelink timing offset and the timing of the uplink frame being the integer number of symbols.

14. The method of claim 13, further comprising:
transmitting a first message to a second device indicating the uplink timing offset; and
receiving a second message from the second device enabling or disabling the uplink timing offset based at least in part on a value of the uplink timing offset.

15. The method of claim 11, further comprising:
selecting the uplink timing offset and the sidelink timing offset based at least in part on determining a minimum misalignment between the timing of the uplink frame and the sidelink timing offset.

16. The method of claim 1, further comprising:
determining that the first UE and the second UE are not synchronized; and
determining that the first sidelink communication timing of the first UE is different from the second sidelink communication timing of the second UE based at least in part on the first UE and the second UE not being synchronized, wherein determining the sidelink timing offset to be used by the first device is based at least in part on the first sidelink communication timing being different from the second sidelink communication timing.

17. The method of claim 16, further comprising:
aligning the first sidelink communication timing of the first UE with a reception timing; and
aligning the second sidelink communication timing of the second UE with a transmission timing, wherein determining the sidelink timing offset is further based at least in part on the reception timing and the transmission timing.

18. The method of claim 17, further comprising:
identifying a first difference between a timing of an uplink frame for transmitting uplink messages and the reception timing and a second difference between the timing of the uplink frame and the transmission timing, wherein determining the sidelink timing offset is based at least in part on the first difference and the second difference.

19. The method of claim 16, further comprising:
synchronizing the first UE and the second UE to the first device based at least in part on determining that the first UE and the second UE are not synchronized.

20. The method of claim 19, further comprising:
transmitting a message to the first UE and the second UE indicating for the first UE and the second UE to synchronize to the first device; and
transmitting sidelink synchronization signals to the first UE and the second UE, wherein synchronizing the first UE and the second UE to the first device is based at least in part on the sidelink synchronization signals.

21. The method of claim 1, further comprising:
receiving a message from a second device indicating a sidelink timing advance command associated with repeating sidelink messages between the first UE and the second UE, wherein determining the sidelink timing offset to be used by the first device in repeating the sidelink message between the first UE and the second UE is further based at least in part on the sidelink timing advance command.

22. An apparatus for wireless communication at a first device, comprising:
at least one processor; and
memory coupled to the at least one processor, the memory storing instructions executable by the at least one processor to cause the first device to:
perform, by the first device, one or more measurements on reference signals received from a first user equipment (UE) and a second UE;
identify, by the first device and based at least in part on the one or more measurements, a first sidelink communication timing of the first UE in communication with the first device and a second sidelink communication timing of the second UE in communication with the first device;
determine, by the first device and based at least in part on the first sidelink communication timing and the second sidelink communication timing, a sidelink timing offset to be used by the first device in repeating a sidelink message between the first UE and the second UE; and
repeat, by the first device, the sidelink message between the first UE and the second UE in accordance with the sidelink timing offset.

23. The apparatus of claim 22, wherein the instructions are further executable by the at least one processor to cause the first device to:

determine that the first UE and the second UE are synchronized; and
determine that the first sidelink communication timing of the first UE is a same sidelink communication timing as the second sidelink communication timing of the second UE based at least in part on the first UE and the second UE being synchronized, wherein determining the sidelink timing offset to be used by the first device is based at least in part on the first sidelink communication timing being the same sidelink communication timing as the second sidelink communication timing.

24. The apparatus of claim 23, wherein the instructions are further executable by the at least one processor to cause the first device to:
receive a message from a second device indicating that the first UE and the second UE are synchronized, wherein determining that the first sidelink communication timing of the first UE is the same sidelink communication timing as the second sidelink communication timing of the second UE is based at least in part on receiving the message.

25. The apparatus of claim 23, wherein the instructions are further executable by the at least one processor to cause the first device to:
determine that the first device is synchronized to one or both of the first UE or the second UE, wherein determining that the first sidelink communication timing of the first UE is the same sidelink communication timing as the second sidelink communication timing of the second UE is based at least in part on determining that the first device is synchronized to one or both of the first UE or the second UE.

26. The apparatus of claim 22, wherein the instructions are further executable by the at least one processor to cause the first device to:
determine that the first UE and the second UE are not synchronized; and
determine that the first sidelink communication timing of the first UE is different from the second sidelink communication timing of the second UE based at least in part on the first UE and the second UE not being synchronized, wherein determining the sidelink timing offset to be used by the first device is based at least in part on the first sidelink communication timing being different from the second sidelink communication timing.

27. The apparatus of claim 22, wherein the instructions are further executable by the at least one processor to cause the first device to:
receive a message from a second device indicating a sidelink timing advance command associated with repeating sidelink messages between the first UE and the second UE, wherein determining the sidelink timing offset to be used by the first device in repeating the sidelink message between the first UE and the second UE is further based at least in part on the sidelink timing advance command.

28. An apparatus for wireless communication at a first device, comprising:
means for performing, by the first device, one or more measurements on reference signals received from a first user equipment (UE) and a second UE;
means for identifying, by the first device and based at least in part on the one or more measurements, a first sidelink communication timing of the first UE in communication with the first device and a second sidelink communication timing of the second UE in communication with the first device;
means for determining, by the first device and based at least in part on the first sidelink communication timing and the second sidelink communication timing, a sidelink timing offset to be used by the first device in repeating a sidelink message between the first UE and the second UE; and
means for repeating, by the first device, the sidelink message between the first UE and the second UE in accordance with the sidelink timing offset.

29. A non-transitory computer-readable medium storing code for wireless communication at a first device, the code comprising instructions executable by at least one processor to:
performing, by the first device, one or more measurements on reference signals received from a first user equipment (UE) and a second UE;
identify, by the first device and based at least in part on the one or more measurements, a first sidelink communication timing of the first UE in communication with the first device and a second sidelink communication timing of the second UE in communication with the first device;
determine, by the first device and based at least in part on the first sidelink communication timing and the second sidelink communication timing, a sidelink timing offset to be used by the first device in repeating a sidelink message between the first UE and the second UE; and
repeat, by the first device, the sidelink message between the first UE and the second UE in accordance with the sidelink timing offset.

* * * * *